(12) United States Patent
Agovic et al.

(10) Patent No.: US 8,719,781 B2
(45) Date of Patent: May 6, 2014

(54) UNIVERSAL AND ADAPTIVE SOFTWARE DEVELOPMENT PLATFORM FOR DATA-DRIVEN APPLICATIONS

(76) Inventors: Amer Agovic, St. Louis Park, MN (US); Amrudin Agovic, St. Louis Park, MN (US)

( * ) Notice: Subject to any disclaimer, the term of this patent is extended or adjusted under 35 U.S.C. 154(b) by 324 days.

(21) Appl. No.: 13/308,851

(22) Filed: Dec. 1, 2011

(65) Prior Publication Data

US 2013/0145348 A1    Jun. 6, 2013

(51) Int. Cl.
*G06F 9/44*    (2006.01)
(52) U.S. Cl.
CPC ........................................ *G06F 8/30* (2013.01)
USPC ............................ 717/120; 717/106; 717/107
(58) Field of Classification Search
CPC ........................................................ G06F 8/30
USPC ............................................ 717/106, 107, 120
See application file for complete search history.

(56) References Cited

U.S. PATENT DOCUMENTS

| | | | |
|---|---|---|---|
| 6,763,344 B1 | 7/2004 | Osentoski et al. | |
| 7,236,982 B2 * | 6/2007 | Zlatanov et al. | 1/1 |
| 7,634,455 B1 | 12/2009 | Keene et al. | |
| 7,761,844 B2 * | 7/2010 | Bove et al. | 717/106 |
| 7,958,146 B2 | 6/2011 | Crim et al. | |
| 7,958,150 B2 | 6/2011 | Bird | |
| 2002/0049788 A1 * | 4/2002 | Lipkin et al. | 707/513 |

* cited by examiner

*Primary Examiner* — Phillip H Nguyen
(74) *Attorney, Agent, or Firm* — Winthrop & Weinstine, P.A.

(57) ABSTRACT

A software application platform that abstracts a computing platform, a database layer, and a rendering medium is disclosed. A platform-independent application programming interface is disclosed, as well as an abstract database layer. The abstraction of the database layer comprises two sub-layers, including a layer having a uniform interface that treats data records as plain objects and a layer having constructs that facilitate the automated generation of user interfaces for data record navigation and management. Further, a software application platform that is independent of rendering medium is disclosed.

19 Claims, 39 Drawing Sheets

UNIVERSAL AND ADAPTIVE SOFTWARE DEVELOPMENT PLATFORM FOR DATA-DRIVEN APPLICATIONS

BACKGROUND

Traditionally when applications are developed, a developer first makes a decision as to what kind of platform to use (e.g. Windows®, Linux®). Decisions also have to be made about whether an application will be web-based or desktop based, whether it will run in a server-client environment or as standalone application, and what kind of database system the application will utilize. Once the relevant decisions are made the development commences. FIG. 1 shows this process conceptually. Problems arise when requirements change over time and when suddenly a desktop application has to be turned into a web-application. Problems also arise if a developer is required to move to a different database system. Frequently such changes require major restructuring and involve significant costs.

It is possible to develop applications that can run across operating system platforms. It is also possible to develop applications that abstract the communication with an underlying database system and are thus portable across database platforms. Applications that are capable of abstracting different presentation media are rare if not nonexistent. Abstracting presentation media means separating software development to a maximum degree from the medium on which it will be used, whether it is a computer desktop, a web browser or a mobile device. This type of abstraction is challenging in particular because by nature these applications behave differently. For instance a web-application is inherently stateless. In order to provide a presentation medium abstraction layer, these differences have to be taken into account and reconciled.

SUMMARY

As shown in FIG. 2, an inventive application platform that abstracts the computing platform, the database layer, and the rendering medium is disclosed. Typically application developers strive for independence across one or two of these aspects, but not all three. Achieving independence across all three is not a trivial task. In the instant application platform, costly choices in these three areas do not have to be made in advance of the development process. Instead software development is treated as a black box. As shown in FIG. 3, the instant application platform has an application programming interface ("API") which is consistent and identical on every platform making it platform independent. As shown in FIG. 4, the application platform also abstracts away particulars of the data access layer to provide persistence independence. The abstraction of the database layer includes two sub-layers. In the bottom layer database independence is achieved and a uniform interface is exposed that treats data records (e.g. table rows) as plain objects. In the upper data layer are constructs that facilitate automated generation of user interfaces for record navigation and management. The resulting system provides the immediate ability to manage database records, programmatically as well as on the user side, without the need to re-implement the basic management tasks over and over again. Further, as shown in FIG. 5, the platform is not dependent on the rendering medium. This platform distinguishes itself the most in its abstraction of the rendering medium, or presentation layer. It allows a developer to create an application once and make it available in several presentation forms such as the desktop, the web or mobile devices with very little added effort. This application platform enables a developer to create several different application types in the same manner. For instance, application types may include web applications, rich client desktop application, thin client desktop application, mobile application, games, and server side services without any user interface.

While each aspect of the instant application platform is itself unique, as shown in FIGS. 2 and 6, the combination of the independent aspects of the instant platform makes for a powerful application that achieves universality across various previously known computing environment restrictions.

One embodiment of the invention is a method of developing a software application configured to run on a computing device in an adaptive fashion and independent of operating system, database system, and presentation medium, comprising the steps of using an operating system-independent computer programming language to create a software application comprised of one or more modules; using a persistence layer in the application configured to abstract access to a database residing on a physical storage medium wherein the persistence layer is capable of abstracting access to data records adaptively at runtime without hardcoding specific information about each record type; using a record management layer in the application configured to enable collection and manipulation of data record information in the persistence layer through both an application programming interface and one or more user interfaces and capable of providing management functionality adaptively at runtime for a given record type; using an adaptive presentation layer in the application capable of generating a plurality of views from a single set of data models that are capable of display on a plurality of presentation media and wherein the presentation layer is capable of auto-generating views at runtime based on the structure of the data models such that the views reflect changes in the database; and releasing the software application for use on one or more computing devices. The embodiment may further comprise one or more of the persistence layer being capable of adjusting itself to structural changes of data residing in the database; the record management layer being capable of adjusting to changes in the persistence layer and storage medium; the persistence layer being configured to access a plurality of database protocols; the persistence layer being configured to access two or more databases simultaneously; and the software application comprising a main application module, a kernel module, a storage module, and any custom-added modules.

Another embodiment is a persistence layer system for providing a computer software application uniform and dynamic access to a physical storage medium, comprising a connection object configured to communicate data records between a file system or database residing on the storage medium and the application program residing in transient computer memory wherein the connection object includes functions to load, find, save, create and synchronize record objects with corresponding entries in the storage medium and functions to initiate and end storage sessions and ensure exclusive access to storage medium resources; wherein further the connection object initiates transactions with and communicates commands to the storage medium; a connection definition object configured to use the connection object to read meta record information from the file system or database wherein the meta record information includes record type and record structure; a plurality of record objects wherein each record object includes connection object origination information, a meta record object containing information describing the record object structure, record field values, and functions to get and set field values, field names, field attributes and a record state that indicates a stage of a record life cycle; wherein the connection definition object includes functions to retrieve information relevant to creating meta records dynamically; wherein each meta record object corresponds to an object in the storage medium and includes one or more of field names and field types; a plurality of entity objects wherein each entity object is configured to enforce data coherence rules over a set of related record objects and data fields; wherein each entity object includes a meta entity object containing information describing the entity object structure and containing at least one meta record object; wherein each entity object includes one or more default field values; wherein each entity object is configured at runtime to accept instructions to modify one or more data fields consistent with the data coherence rules; wherein each entity object provides a plugin mechanism to allow changes to be performed before and after life cycle events; and wherein each entity object is configured at runtime to validate data field values.

The persistence layer system may further comprise the file system or database being a relational database; the connection definition object including functions to retrieve table names, table columns, column types, schemas, primary and foreign keys that are relevant to creating record objects dynamically from relational databases; and each meta record object including one or more of foreign keys and primary keys.

The persistence layer system may further comprise a plurality of connection objects each configured to communicate data records between a file system or database residing on the storage medium and the application program residing in transient computer memory, wherein the system is configured to allow the transfer of data records between each connection object and its associated database.

Additionally, the persistence layer system may further comprise one or more of each meta record object corresponding to a table in a relational database; each meta record object corresponding to a file in a file system; each meta record object being manually constructed; each meta record object being created from an annotated class and a native or emulated reflection process; and each meta record object being created dynamically at runtime from the connection definition object, which in turn allows Record and Entity objects to be created dynamically at runtime.

Another embodiment is a record management system for managing information in a computer software application running on a computing device, comprising a persistence layer capable of providing the computer software application uniform and dynamic access to a database residing on a physical storage medium; a detail object configured at runtime to coordinate and manipulate a set of fields within an entity object wherein the detail object also allows custom operations to be infused and executed on the entity object; a directory object configured at runtime to coordinate and manipulate a set of entity objects, wherein the directory object includes: (a) a connection with the persistence layer, (b) a detail object, (c) a filter manager and at least one filter configured to extract a subset of entity objects to be displayed, (d) a parameter set with no or multiple parameters, wherein parameters capture field names and values by which to search, wherein the values are infused into the filter as conditions, (e) a keeper object configured to generate one or more data models and one or more data views and which is used for generating views and models at runtime, (f) a navigation model object configured to control the means for browsing through the set of available entity objects, (g) a table entity face object configured at runtime by the filter object to store a page of the set of entity objects, and (h) a lookup manager configured at runtime to manage a plurality of lookup objects wherein lookup objects are used to replace field values containing references with interpretable values; wherein multiple directory objects can be assigned a single detail view by one or more owner relationship objects which indicate the fields by which entity objects are related; a directory view object associated with the directory object, configured to construct itself at runtime based upon the set of entity objects, and further comprising a plurality of sub-view objects, wherein the directory view and subviews are capable of reflecting any changes in the underlying directory objects and field definitions in the database; wherein the directory view generates a subview for each object included in the directory including but not limited to a parameter view, a filter manager view, a parameter set view, a navigation view and a table view object wherein each subview is associated with the correspondingly named object from the directory object and wherein the subviews are generated at runtime using the keeper object; wherein the directory view object and its subviews are configured to receive input signals from a user to modify one or more of the parameters in the parameter set, at least one filter, the set of entity objects, the page, and the table entity face object and to relay the signals to the directory object or relevant sub-object; and wherein the directory view object is further configured to create a detail view object in response to a signal from a user interface object wherein the detail view object is associated with the detail object.

The record management system may further comprise the table view including a plugin mechanism for rendering rows and cells. Further, the record management system may further comprise a row renderer object configured to display table rows in a customized fashion and a cell renderer object configured to display table cells in a customized fashion wherein the cell renderer objects can be infused into the directory view, for a specific cell, for a specific field name or for a field type.

Another embodiment is a presentation layer system for providing a computer software application independent of presentation medium and capable of auto-generating user interfaces for record management tasks and application tasks in general, comprising a dynamic record management system; one or more model objects implementing a model interface; an abstract interface for a model that allows multiple views to bind and allows the views to explore its structure and presentation needs wherein the same set of models are associated with views on different presentation mediums; one or more view objects each implementing a view interface wherein each view object interface is capable of being bound to a model object by a listener object that listens for messages originating from the model object; wherein all views bound to the model object are notified of a change in the model object and subsequently update themselves; wherein each view keeps a reference to each model object to which it is bound; wherein each model keeps references to each view that is subscribed or bound to it; wherein the model object interface of each model object is capable of being bound to multiple view objects; wherein on receiving a user input signal, the view relays information and commands to the model and updates itself if it is notified by the model of any resulting changes; a rendering module configured to invoke the drawing of user interface objects on a specific presentation medium, wherein each presentation medium shares the same set of underlying models; and wherein the rendering module is configured to generate dynamically at runtime a plurality of medium and model specific user interface objects for the computer software application using the model interface to explore its structure and its view placement, so as to reflect any changes in the models and in the underlying database structure, and using a facility to request and construct views. This presentation layer system may further comprise the facility to request and construct views being a view keeper wherein the view keeper is capable of generating a view object when given a model and is capable of caching previously generated views and wherein the view keeper binds the view object to one model.

DESCRIPTION OF THE DRAWINGS

FIG. 32 is an example of a detail view in HTML.

DETAILED DESCRIPTION

Figure 1:
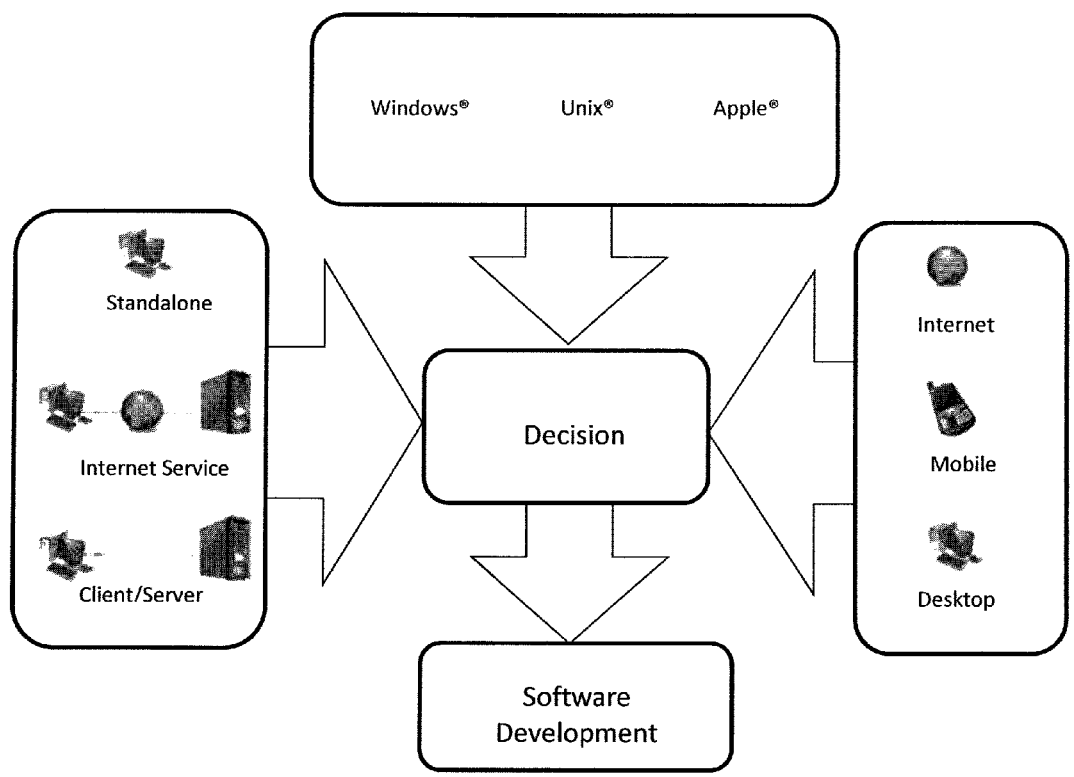
FIG. 1 shows a prior art software development process.
Figure 2:
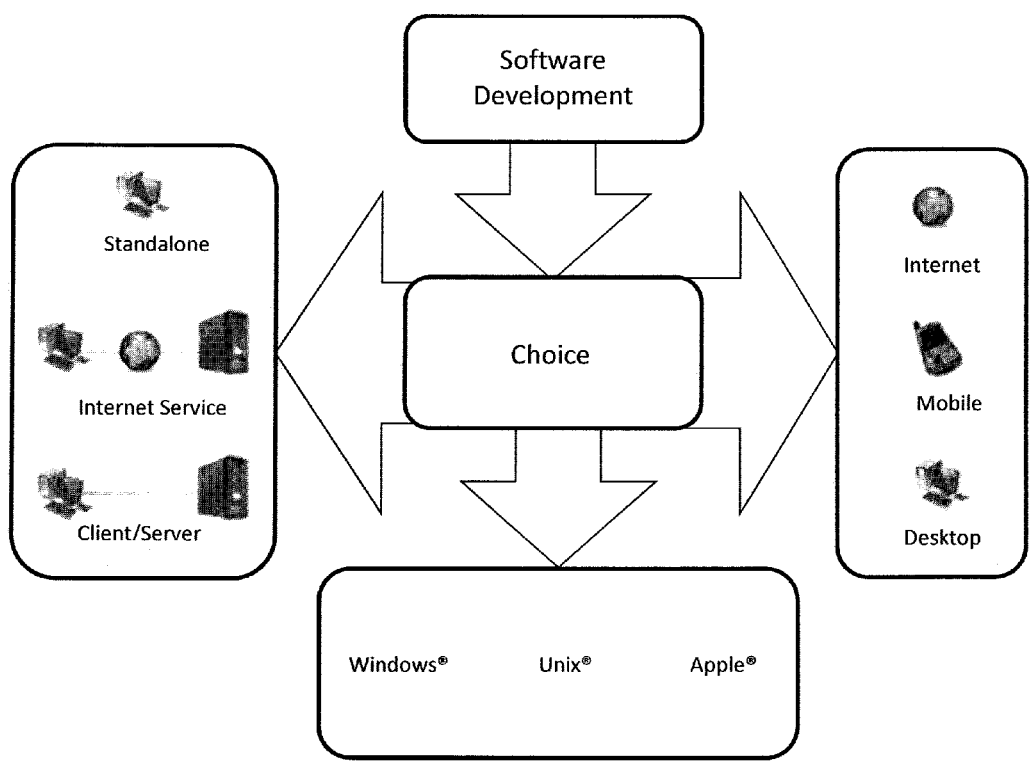
FIG. 2 shows a novel software development process.
Figure 3:
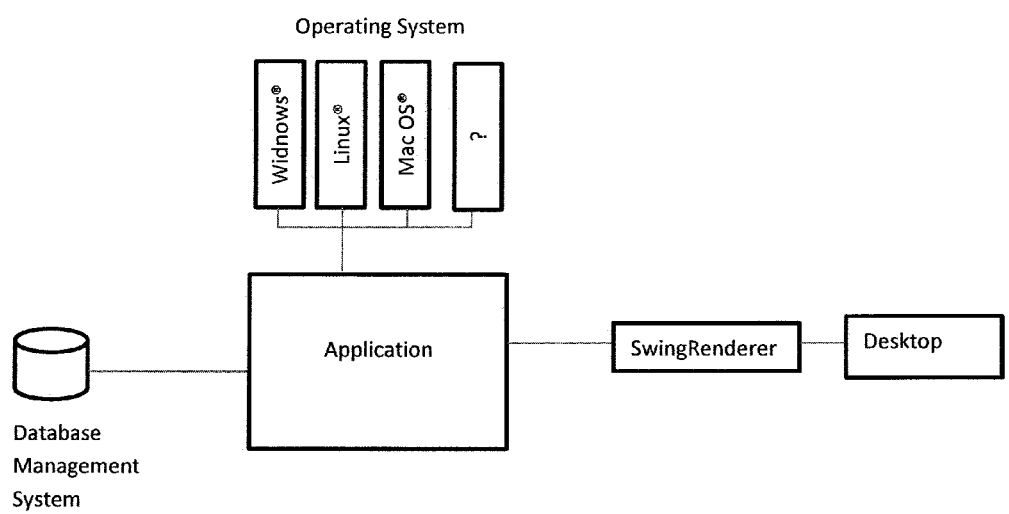
FIG. 3 shows a software application that is independent of operating system.
Figure 4:
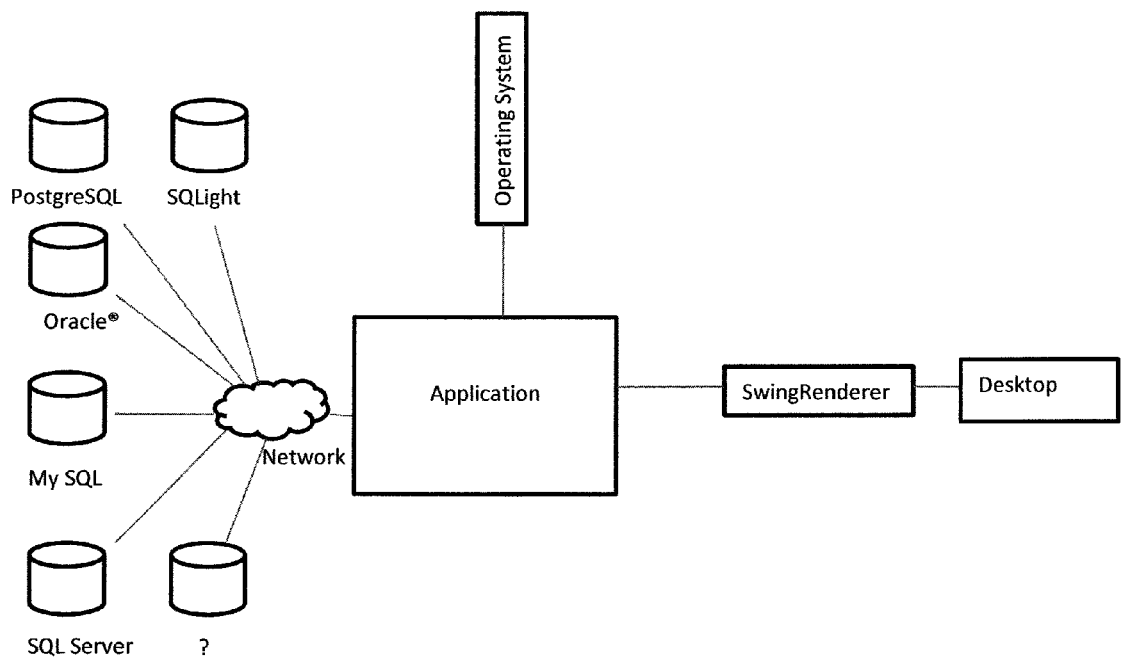
FIG. 4 shows a software application that is independent of database platform.
Figure 5:
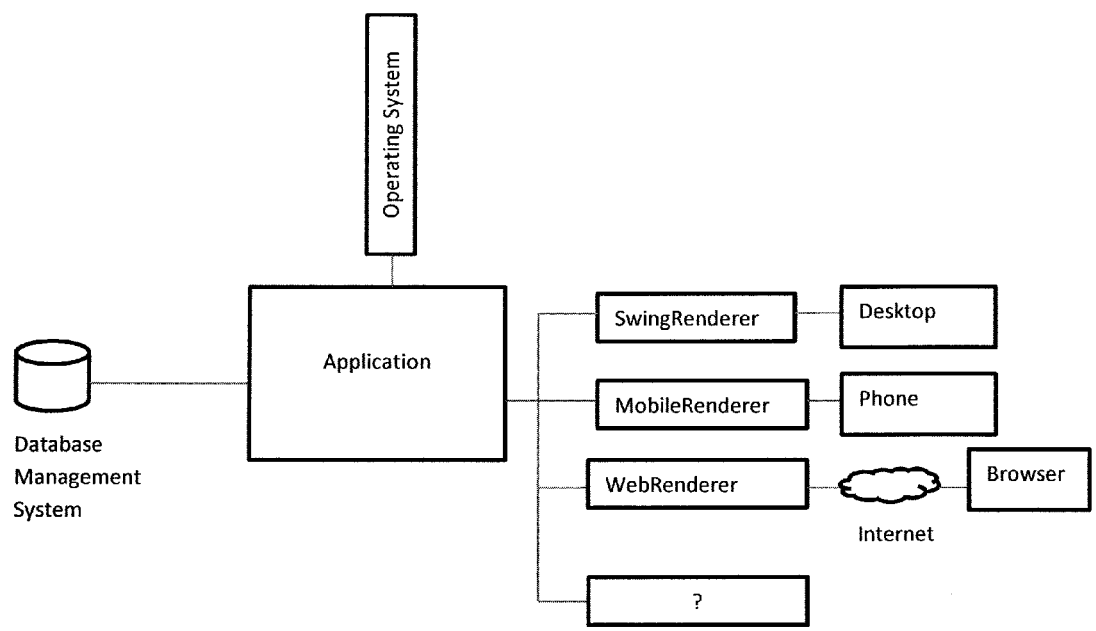
FIG. 5 shows a software application that is independent of presentation medium.
Figure 6:
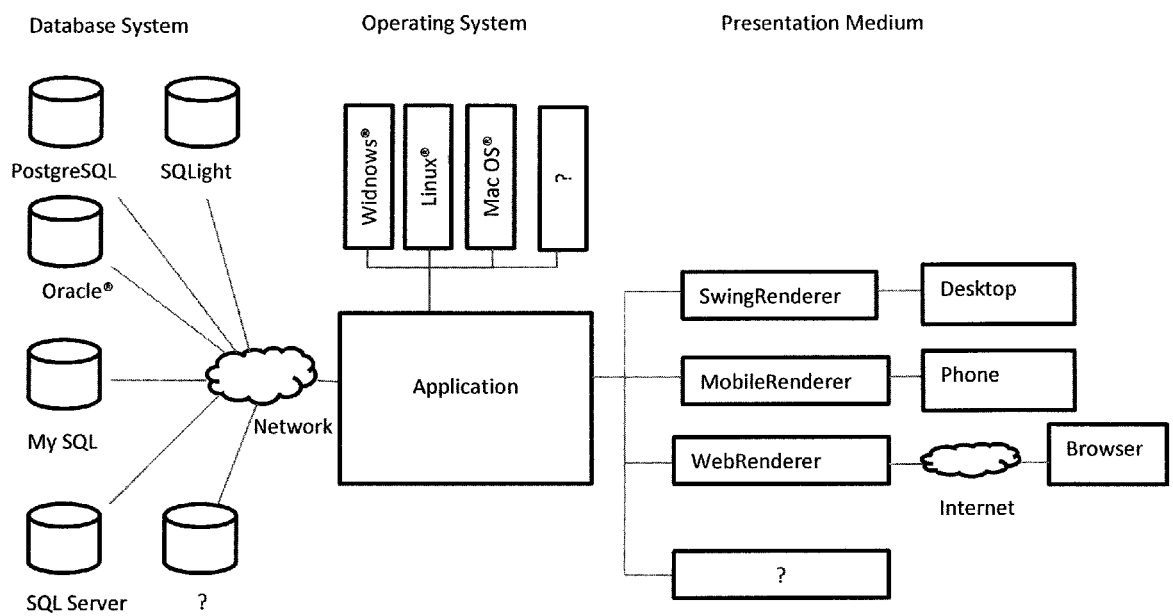
FIG. 6 shows an embodiment of a software application that is independent of operating system, database platform, and presentation medium.
Figure 7:
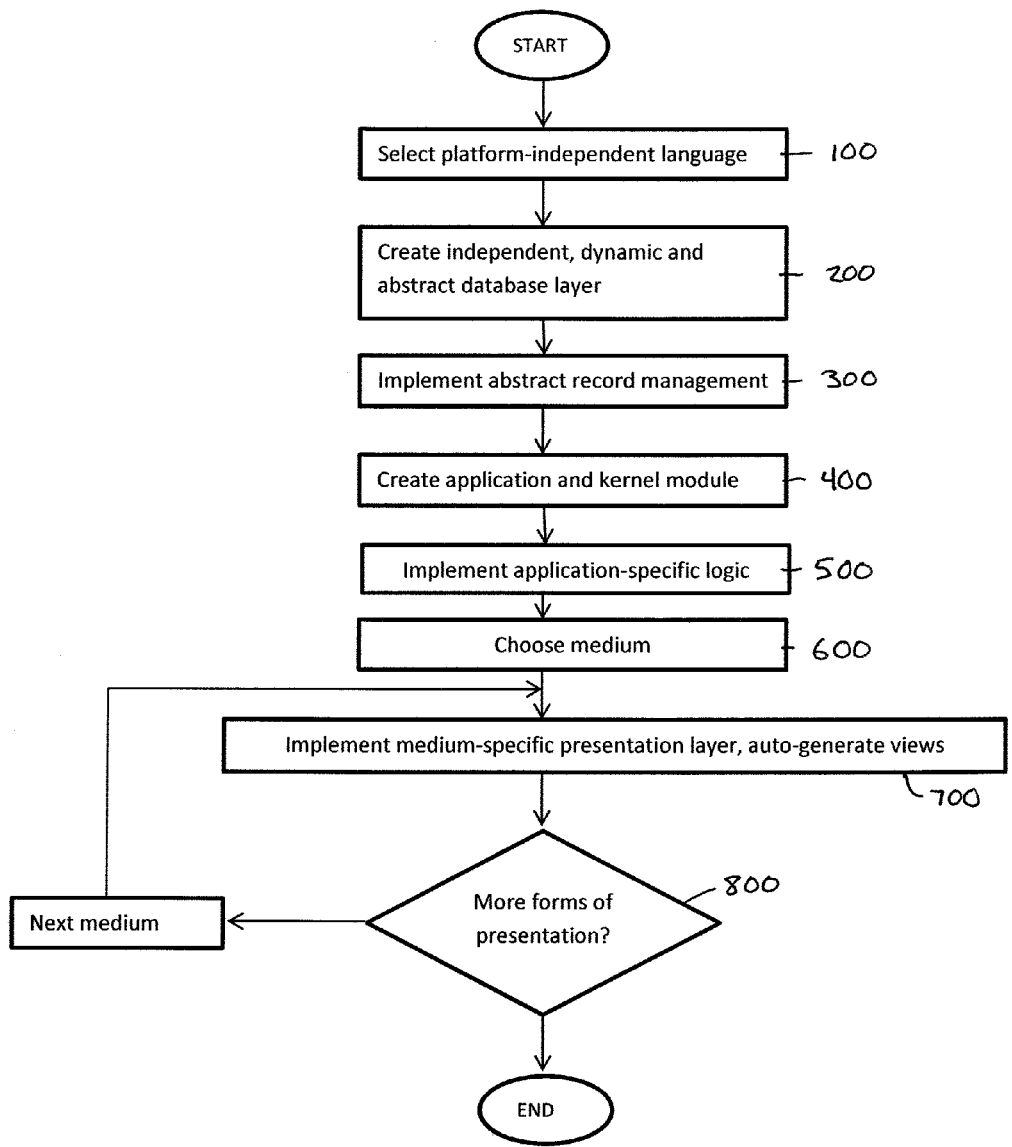
FIG. 7 shows an embodiment of a software development process.

FIG. 7 shows an embodiment of a software development process for developing software applications that are independent of operating system, database platform, and presentation media. The software development process comprises the steps of selecting a platform independent language 100, creating an independent, dynamic, and abstract data layer 200, implementing abstract record management 300, creating an application and kernel module 400, implementing application-specific logic 500, choosing a presentation medium 600, implementing a medium-specific presentation layer and auto-generating views 700, and determining whether there are additional forms of presentation media 800 and if so, repeating step 700. These steps will be further described below.

Figure 8:
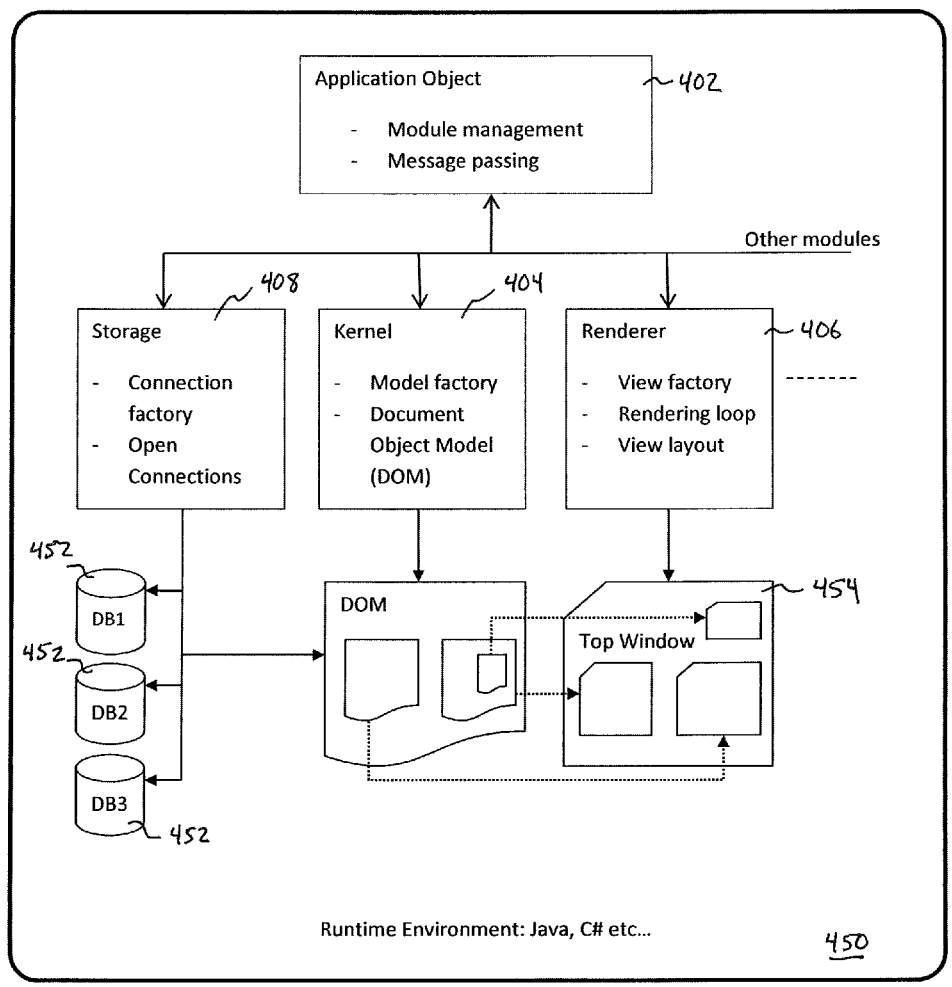
FIG. 8 shows an embodiment of an application infrastructure.

FIG. 8 shows an embodiment of an application platform infrastructure. The application platform exposes an execution entry point to enable underlying platform to launch it. The main entry point creates an application object 402 and hands over execution control. The application object represents the top most encapsulation of the application. It is designed to manage one or more dynamically loaded modules and to act as a message passing go-between for the modules. The application object therefore manages the lifecycle of the modules and provides the communication infrastructure for modules. Frequently, during the application initialization a distributed application state management or "hive" is created and exposed for usage. During the same initialization, an application usually needs to create a module that is responsible for logic or data and is normally known as the kernel 404. For applications that have a user interface such as web applications or desktop applications an additional module named renderer 406 is also loaded. The abstraction of the renderer allows a developer to provide the same application as a web application or desktop application just by switching the renderer module that is loaded at start time. From here on the application initialization depends on the context. However, the application also provides ways to dynamically publish model and view factories (known as keepers) so that unrelated modules know how to open or present new and unknown data or application sections. Finally when the hive management system is used, the application state is exposed in a global fashion that is highly amenable for dynamically loaded modules. Applications that interface with one or more databases may load a storage module 408.

The application platform infrastructure and its associated objects and modules operate within a runtime environment within a computing device 450 such as, without limitation, a server, desktop computer, laptop computer, tablet computer, mobile phone or other device. The computing device 450 may be in electronic communication with one or more physical storage media 452, such as, without limitation, a disc drive, flash memory, or other storage medium wherein one or more databases may reside as well as a transient medium or memory. The computing device 450 may also be in electronic communication with a rendering medium 454 such as, without limitation, a screen or monitor on which may be displayed a web browser window or dedicated visual interface.

Figure 9:
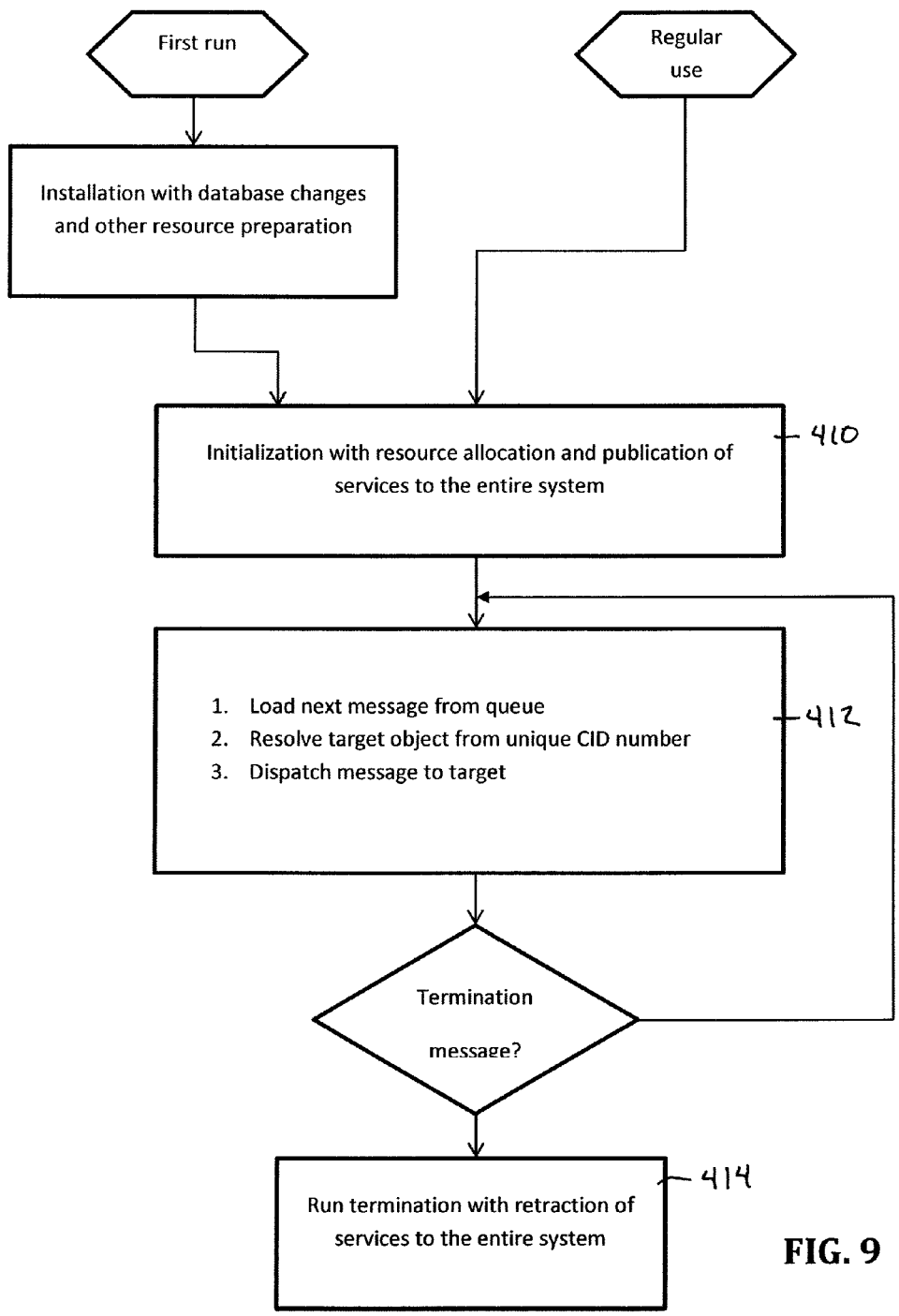
FIG. 9 shows an embodiment of a software module life cycle.

As shown in FIG. 9, each module, including the application object as the top-most module, goes through a life cycle. The stages of the life cycle include initialization 410, execution 412, and termination 414.

Figure 10:
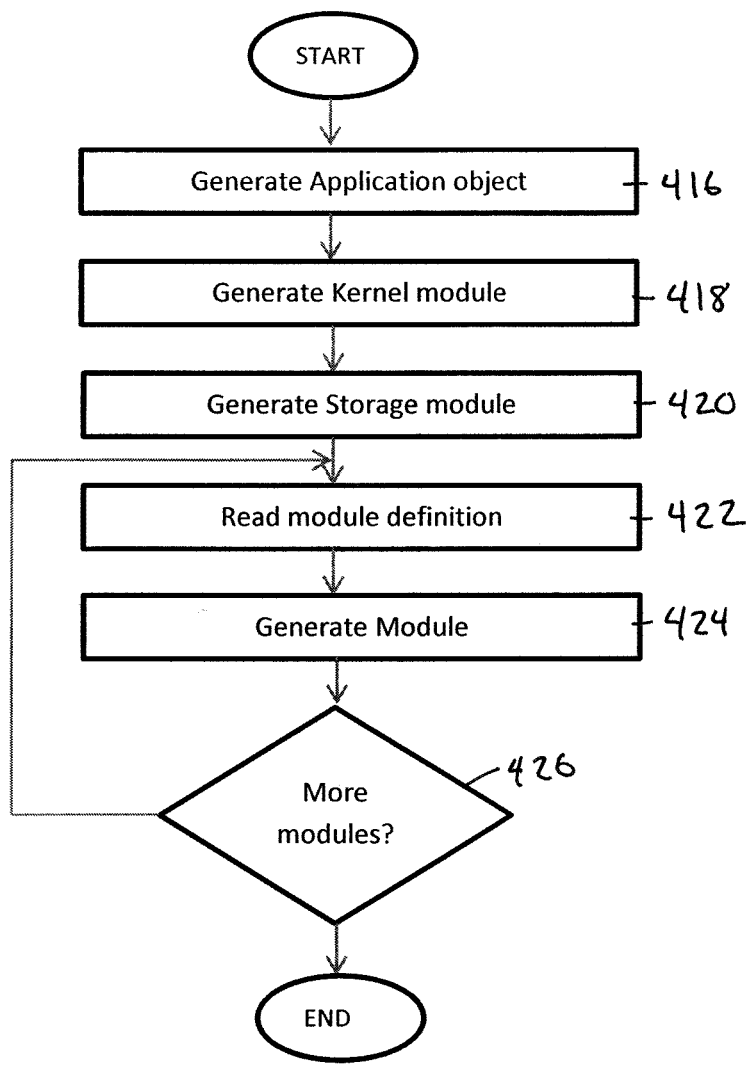
FIG. 10 shows an embodiment of a process for creating a software application.

During the initialization of the application it is common to load one or more modules such as the kernel. The order of the application initialization can be easily encoded as a configuration file. The loading process includes following steps:
- Locating a module class in the repository of available modules
- Creating a new instance of the module
- Delegating the initialization of the module to an "onInit" routine of the module
- Directing the module to publish its services, if any, including a menu to the rest of the application
- Broadcasting a message to notify other modules of a change in life cycle FIG. 10 shows an exemplary embodiment of step 400 in FIG. 7, namely creating an application and kernel module. The steps of the embodiment shown in FIG. 10 are generating an application object 416, generating a kernel module 418, generating a storage module 420, reading an additional module definition 422, generating the additional module 424, and checking for further modules 426, and if so, repeating steps 422 and 424.

During regular execution a module will act as a message loop processing messages dispatched in its queue by delivering them to the correct message listener objects or targets known as MessageListener objects. The message loop can run in own thread but does not have to. The message dispatching is able to differentiate these two cases and properly deliver messages across threads.

Finally the termination process 414 reverses all the steps of the initialization process by broadcasting the termination event, retracting any services that the module has published, and finally cleaning up its own resources.

The module object is aware of the installation process. The application makes use of a repository of available or installed modules when instantiating new modules. The repository is usually statically determined by developer but it could also be dynamically managed by the application. In the dynamic setting the application would allow the user to install and remove modules from the application. For this case each module has entry points at which it can gain control of the installation process and effect changes to prepare the system, including persistence layer, for its proper functioning.

Independence from the runtime platform is achieved by two means. First, the application platform represents a concise architecture with a corresponding application programming interface ("API"). The adherence to the API contract guarantees compatibility with the framework and desired results from the underlying platform. Secondly, the default implementation of the API is written in the Java language, however implementations in other platform-independent languages such as C# and C++ can be constructed.

As shown in FIG. 8, independence from the database or persistence layer is maintained by a storage module 408. The storage module manages several database connections which might or might not be implementing SQL language protocol. Each Connection object allows the application to work with plain data objects that are then properly serialized and de-serialized from the persistence layer. The plain data objects must conform to the Record interface API. If they do so then the Connection is capable of managing their life cycle. The connection will optimize its operation by caching Record descriptions and frequently used queries. From a Connection object the application can also obtain meta-information about the types and descriptions of allowed Records.

The system includes a framework to facilitate uniform access to data regardless of the database type. By database or database system is meant anything that can store data, particularly in binary form. Relational database management systems ("RDBMS") all claim to support the SQL language but that support is frequently violated in order to provide proprietary enhancements. The problem is that the same enhancements are present in many RDBMS but accessed differently. The end result technologically locks in developers and users complicating their freedom to migrate to alternatives. The framework liberates the developer from choosing a database platform. On one side, the framework connects to a RDBMS and on the other it exposes tables and table records in a dynamic and uniform fashion. All table records are represented by plain objects in the programming language of choice. The developer can then work with these objects without regard to the particular database platform. SQL RDBMS is an exemplary embodiment here, however but it might not be the only way to organize databases, and the framework is configurable to work with other database protocols.

Frameworks that allow plain data objects to be used instead of directly dealing with the database exist already. The framework disclosed here has similar functionality but has been developed with performance in mind. This framework includes some unique features that differentiate it from existing approaches. Above all else, this framework hides the intricacies of the underlying persistence layer. Furthermore, the framework provides an SQL-based implementation, but the entire API is defined independently of the protocol language which, makes it possible to implement support for other types of persistence layers and database protocols. At the core of the proposed framework is an interface or programming construct that describes a record.

Record

A Record is an object comprising of a collection of fields that belong together. In the example of a relational database, a Record would correspond to a row in a table. The record interface in the framework includes:
- A collection of field names as well as methods to get and set the field names.
- A method to map field names to indices
- A collection of field values as well as methods to get and set the values, provided a field index
- Methods to get and set field attributes. Attributes are represented by bit masks and are associated to each field. Attributes reflect properties from the data base such as whether a field is a primary key or a foreign key.

Attributes can also be framework specific or arbitrary and user defined. For instance an attribute might specify whether a field has been modified A method to retrieve the record name Method to set and get record hints. These are arbitrary objects which can be stored along with the record object. For example they are used to cache prepared queries for speedup.

A method to clone the record. Cloning a record makes a copy of it

Methods to get and set the record status which determines its life cycle

Figure 11:
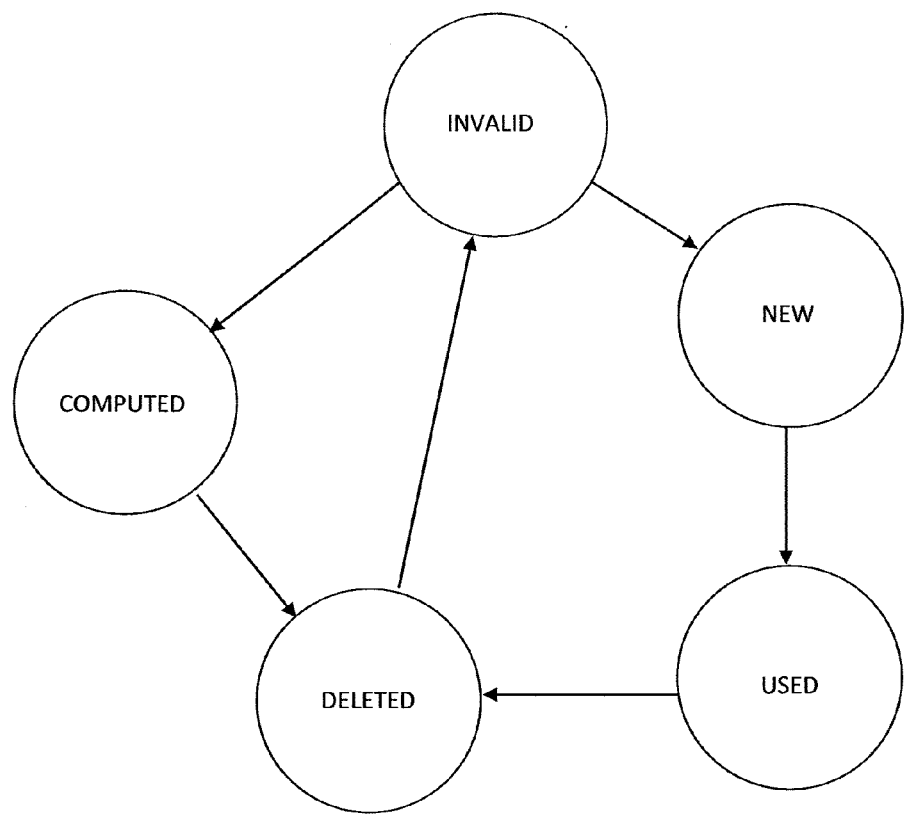
FIG. 11 is a diagram of a record life cycle.

As shown in FIG. 11, the record status reflects the record life cycle and can take on the following values: NEW, USED, DELETED, INVALID, or COMPUTED. The record initially assumes the NEW state after conception but before it is persisted. If a record is persisted it assumes the USED state. Once a record needs to be removed from persistence it assumes the DELETED state. Sometimes and before the record is properly initialized it might be in an INVALID state and sometimes if it is used for non-persistent (transient) purposes it might be in the COMPUTED state.

Figure 12:
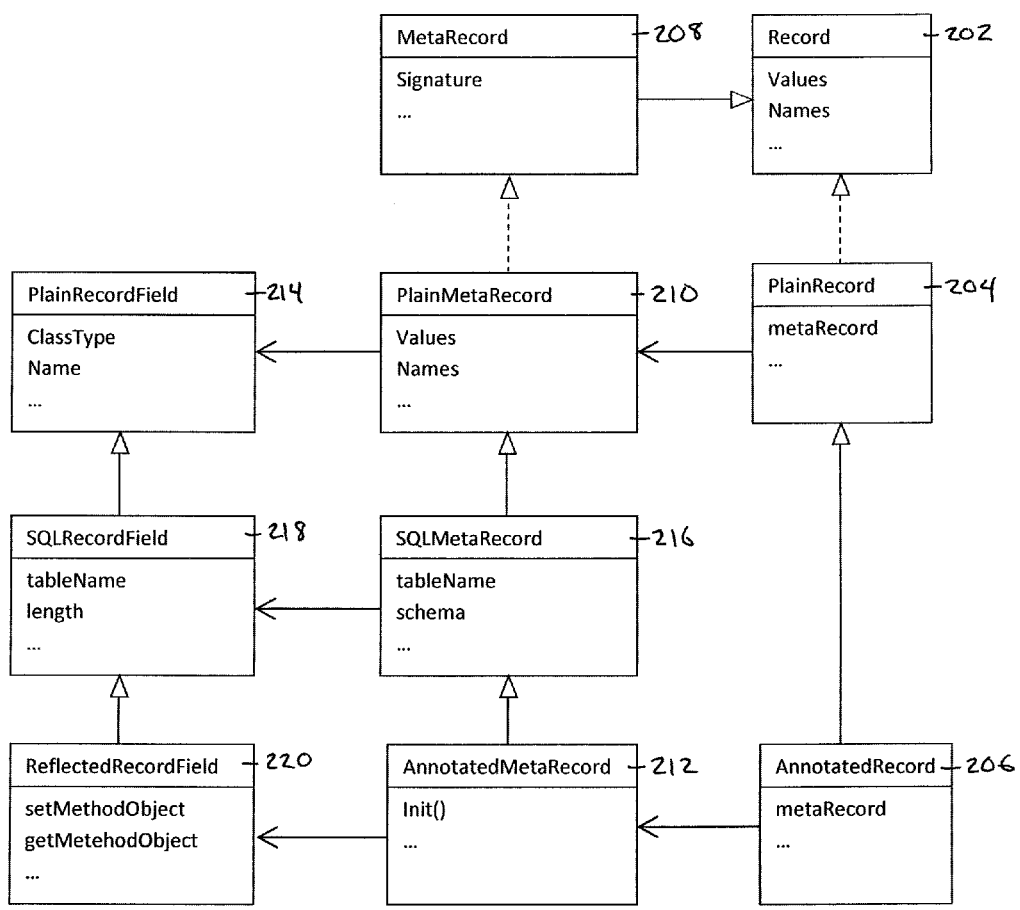
FIG. 12 is a unified modeling language diagram of the record interface, the PlainRecord, the AnnotatedRecord and related classes.

A unified modeling language ("UML") diagram of the Record interface 202 is shown in FIG. 12. PlainRecord 204 and AnnotatedRecord 206 are two implementations of the Record interface where PlainRecord is a plain record object and AnnotatedRecord is an annotated record object. The AnnotatedRecord 206 inherits the PlainRecord 204. All Record implementations typically carry the values of the fields. Meta information such as field names, field types, field count, record name and so on are stored in a special header object which is referred to as MetaRecord 208, further described below.

The PlainRecord 204 contains an array of objects that store the field values, an array of field states, the record status (denoted by an integer), and a plain meta record object, or PlainMetaRecord 210, which contains meta information about the fields. Methods from the Record interface 202 that deal with field names, field types, field attributes, the record name, or any other field meta information utilize the PlainMetaRecord 210. Methods which modify and retrieve field values use the object array included in the PlainRecord 204 object. The PlainRecord 204 is very flexible and for that reason forms the basis for more convenient extensions.

The AnnotatedRecord 206 inherits the PlainRecord 204. The AnnotatedRecord 206 utilizes an annotated meta record object, or AnnotatedMetaRecord, 212 rather than a PlainMetaRecord 210. The main difference in an annotated record has to do with how values are modified and retrieved. The AnnotatedRecord 206 does not have its own functions to set and get field values, rather it requests methods to get and set field values from the AnnotatedMetaRecord 212. These methods are retrieved as objects from the AnnotatedMetaRecord 212 and executed subsequently.

The PlainRecord 204 is manually constructed based on descriptions of the underlying database tables. The AnnotatedRecord 206 is automatically created from the specified plain data object using reflection facilities of the programming language.

MetaRecord

A meta record object or MetaRecord contains information about a record and the fields themselves. This includes databases-related information such as table names, as well as field names and field types. At the most basic level a MetaRecord 208 in the framework is an interface which inherits the Record interface 202. It also provides a function to retrieve a MetaRecord signature. A signature in the framework corresponds to its address in the used namespace.

The simplest implementation of MetaRecord 208 is the PlainMetaRecord 210. The PlainMetaRecord 210 contains:

An object signature/namespace address denoted by a string

A table name

A record status denoted by an integer

A method for cloning. The output of this method is an instance of the Record that the MetaRecord describes Implementations of all of the functions from the Record Interface 202, however in a PlainMetaRecord 210, each field value is of type "PlainRecordField"

A PlainRecordField 214 is a plain record field object containing information about a specific field such as class type, default value, field attributes, field name, and methods to set and get the field information.

SQLMetaRecord

An alternative implementation of the MetaRecord 208 is an SQL meta record, or SQLMetaRecord, 216 designed specifically for SQL-based database interactions. The SQLMetaRecord 216 inherits the PlainMetaRecord 210. In addition, it provides information about whether a record is quoted, catalog name, schema name, and the canonical name. The SQLMetaRecord 216 stores each field value as a SQL record field, or SQLRecordField, 218. The SQLRecordField 218 inherits the PlainRecordField 214. The SQLRecordField 218 additionally provides information about the table name, field length and regular expression patterns used for a given field.

AnnotatedMetaRecord

An AnnotatedMetaRecord 212 inherits the SQLMetaRecord 216. Each field value in the AnnotatedMetaRecord 212 is a reflected record field type, or ReflectedRecordField, 220. The AnnotatedMetaRecord 212 in its initialization is capable of extracting field information from an existing class via language reflection. For example, if a table in the database described cars, a developer can create an object class that mirrors the types in the car table and provides setter and getter methods. By passing this car class to the AnnotatedMetaRecord 212, the developer can generate the needed field descriptions. In addition, the AnnotatedMetaRecord 212 stores the setter and getter methods as objects. This is accomplished by using reflectance property of the underlying programming language.

Information such as schema name can be encoded in the provided object class using annotations. Annotations are programming language constructs that describe or comment the code rather than producing executable instructions. An exemplary annotation describing the table name and schema name might look as follows: @Table(name="Car", schema="dbo")

The ReflectedRecordField object 220 which is used to store individual field values in the AnnotatedMetaRecord 212 inherits the SQLRecordField 218. Additionally, it contains the setter and getter methods for a given field. These setter and getter methods are extracted from the annotated class and are stored as objects.

Connection

Records and MetaRecords provide a means of representing data. However, they live in transient computer memory and are not directly stored on a storage medium or within a database. A connection is an object responsible for synchronizing Record instances with a persistence layer. A Connection in the framework is an interface that contains the following:

A method create(Record), which creates a record entry in storage

A method delete(Record), which deletes the record entry from storage

A method update(Record), which updates the entry in storage

A method called updateIfChanged(Record) which updates only if changes were performed A method refresh(Record), which refreshes the Record using data from storage A method merge(Record), which either creates or updates entry in storage Methods to initiate connection sessions and to end them Methods to find records by unique id Method to retrieve record counts A plugin facility to install objects that can perform Record related operations that go above and beyond what the connection can do but which ultimately only depend on the Connection methods. The plugin objects are called EMIs, which stands for Entity Management Interface, since the higher level operations are usually needed during manipulation of Entity objects.

Ability to cache and lookup known Record types (e.g., MetaRecords)

A Connection abstracts away the underlying database system that is being used. An exemplary embodiment of a connection object in the framework is an SQL connection object, or SQLConnection object. In addition to implementing all of the required functionality from the Connection Interface to deal with a SQL-based database connection, the SQLConnection object provides:

Methods to prepare and submit SQL statements to the database. SQL Statements are queries for selective reads of an arbitrary group of fields which could come from multiple records.

An SQL connection definition object of type SQLConnectionDef which provides meta information about the underlying database. This object could be used to enumerate all available tables or fields within a table.

During regular use, the Connection object is responsible for caching known Record types and special frequently used queries to speed up Record synchronization with the persistence layer. The management of the Record types is what allows the framework to manage several Connections to different databases at the same time and to provide one place for all database access, irrespective of which database is managing what Record.

ConnectionDef

A ConnectionDef is a connection definition object that contains information specific to a database that is needed by the Connection to perform its operations. In the case of the exemplary embodiment of an SQL-based connection definition object, the SQLConnectionDef provides:

Ability to retrieve foreign keys in the database

Ability to retrieve primary keys

Ability to retrieve Table names

Ability to retrieve Schemas

Ability to retrieve Catalogs

Ability to retrieve Columns

Ability to map SQL types to Class Names

A method to generate a MetaRecord given a table name

The ability of the ConnectionDef to generate a MetaRecord based on existing tables in the database is important because it allows the framework ultimately to generate Record objects dynamically based on the underlying database structure.

Figure 13A:
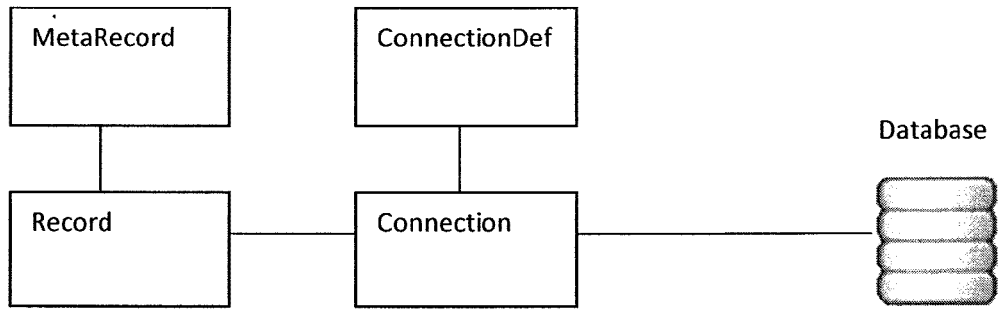
FIG. 13A is a diagram of a record interacting with a database.
Figure 13B:
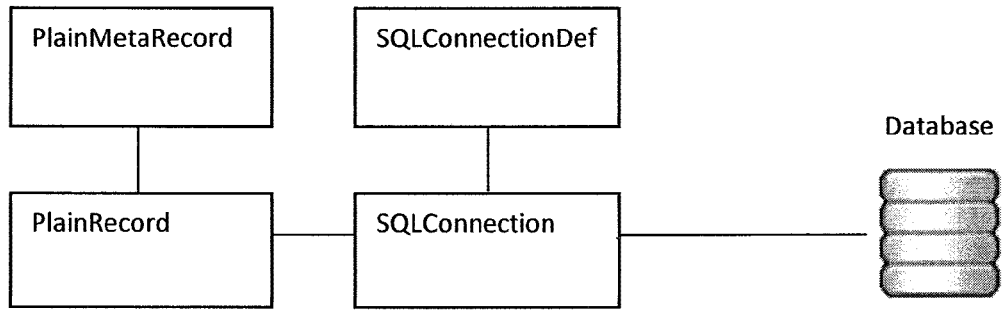
FIG. 13B is a diagram of a PlainRecord interacting with an SQL database.
Figure 13C:
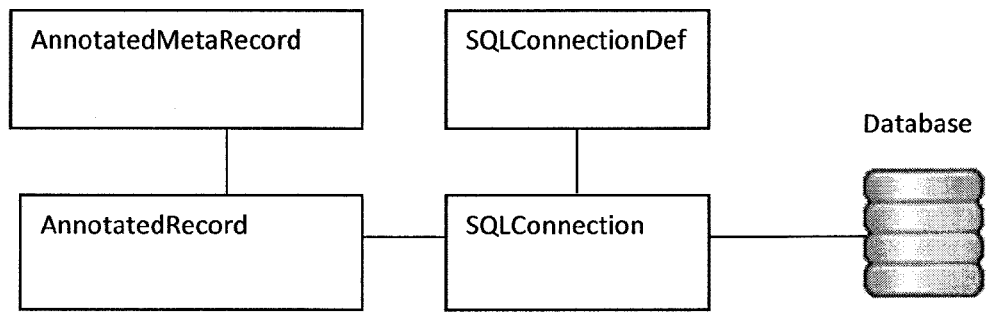
FIG. 13C is a diagram of an AnnotatedRecord interacting with an SQL database.

FIGS. 13A-13C are schematic representations of the relationships between Connection, ConnectionDef, Record, and MetaRecord objects in relation to a database.

Processes to Retrieve and Use Records

There are at least three methods to retrieve and use records. In the simplest case, a developer manually creates a PlainMetaRecord that describes corresponding records in the database. Subsequently, the framework would use the Connection object to operate with these records—creating, deleting, modifying, and so on.

Alternatively, a developer can create an object which inherits the AnnotatedRecord and mirrors the fields in a database table. For instance, as with a previous example, such an object could be called "Car," mirroring a table describing cars. Annotations in this object would specify the table and schema name. The AnnotatedMetaRecord object would be used to extract fields and methods from the Car class and generate field descriptions. Subsequently, a developer would use the Car class directly to manipulate Car entries in the database. This is possible because the Car class was derived from the AnnotatedRecord. The advantage here is that the developer does not have to deal with a generic Record class, but rather with a custom-created class. A potential disadvantage is that an annotated class would have to be created for every database table.

A third method is the dynamic retrieval and use of records. In this method, the developer only has to specify the table name and request a MetaRecord from the ConnectionDef object. One advantage of this approach is that the Record objects are generated dynamically. Unlike the above-described approaches, if underlying fields change in the database, those changes cause the ConnectionDef object to produce updated MetaRecords to reflect the underlying change. Another advantage is the fact very little work is required to start using data base records. This is especially important in cases with large collections of tables.

Figure 14:
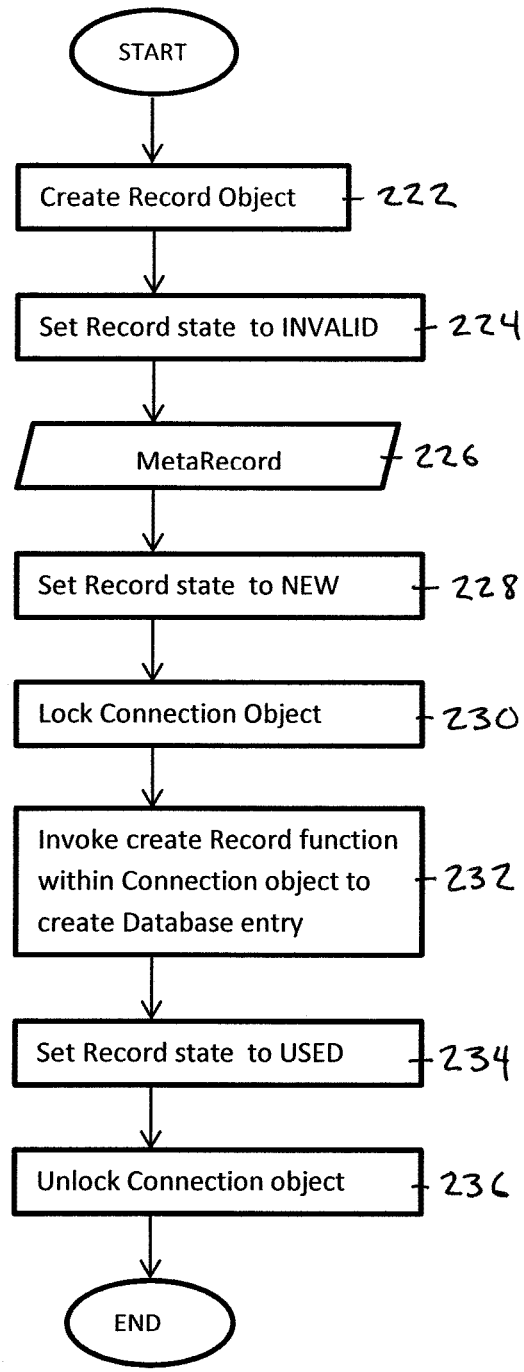
FIG. 14 shows an embodiment of a process for creating a record in an abstract database layer.

FIG. 14 shows an embodiment of a process for creating a record comprising the steps of creating a record object 222, setting the record state to INVALID 224, acquiring and using MetaRecord information 226, setting the record state to NEW 228, locking a connection object 230, invoking a CreateRecord function within the connection object to create a database entry 232, setting the record state to USED 234, and unlocking the connection object 236.

Figure 15:
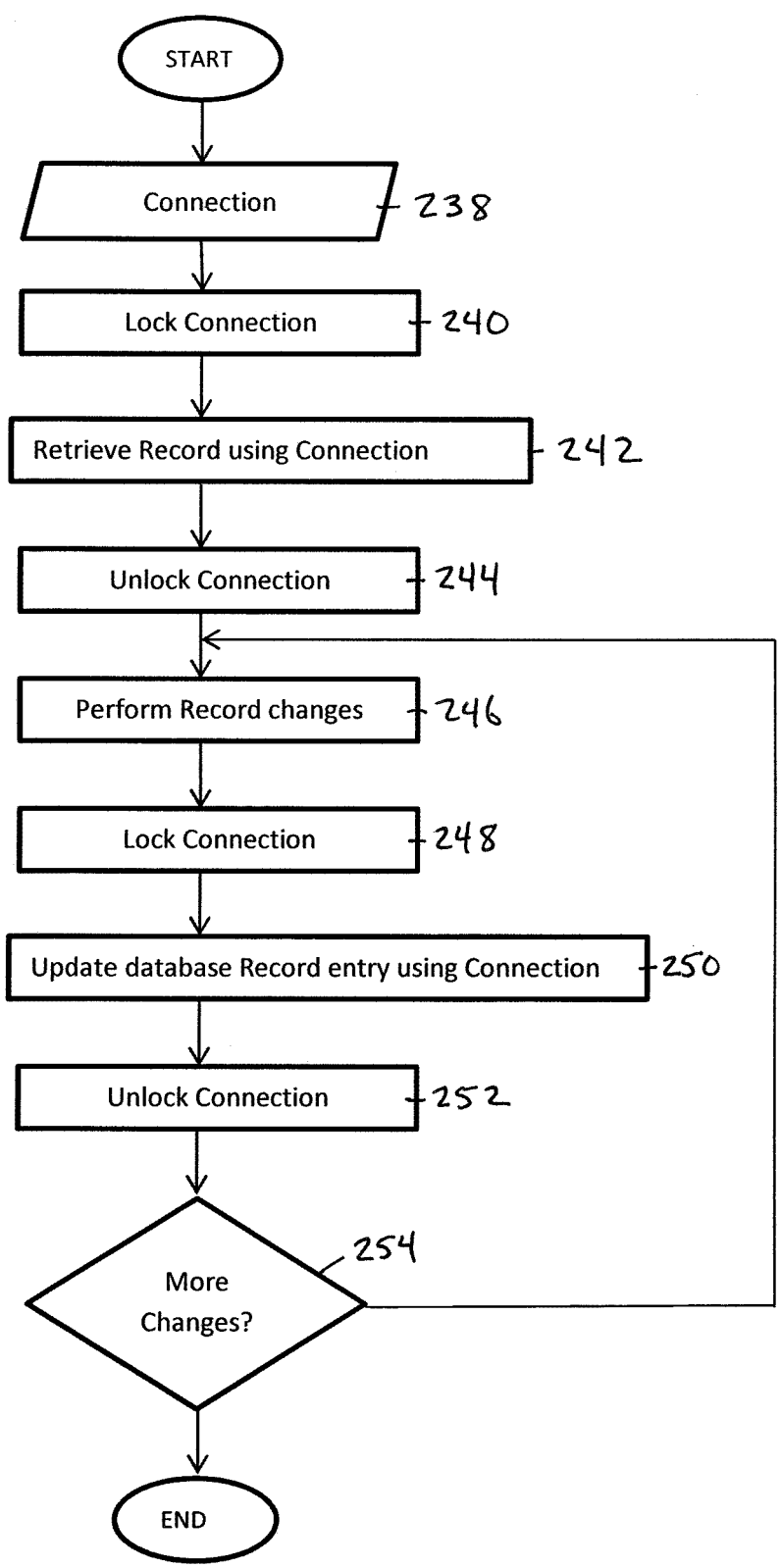
FIG. 15 shows an embodiment of a process for editing a record in an abstract database layer.

FIG. 15 shows an embodiment of a process for editing a record comprising the steps of establishing a connection with a database 238, locking the connection 240, retrieving a record using the connection 242, unlocking the connection 244, performing record changes 246, locking a connection 248, updating a database record entry using the connection 250, unlocking the connection 252, and querying for further changes 254.

Figure 16:
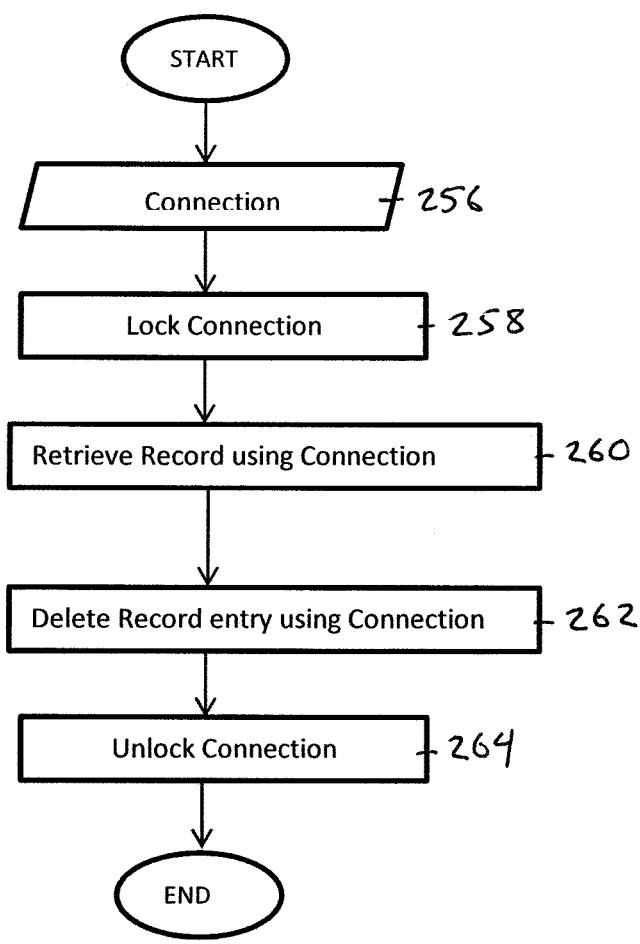
FIG. 16. shows an embodiment of a process for deleting a record in an abstract database layer.

FIG. 16 shows an embodiment of a process for deleting a record comprising the steps of establishing a connection with a database 256, locking the connection 258, retrieving a record using the connection 260, deleting a record entry using the connection 262, and unlocking the connection 264.

Figure 17:
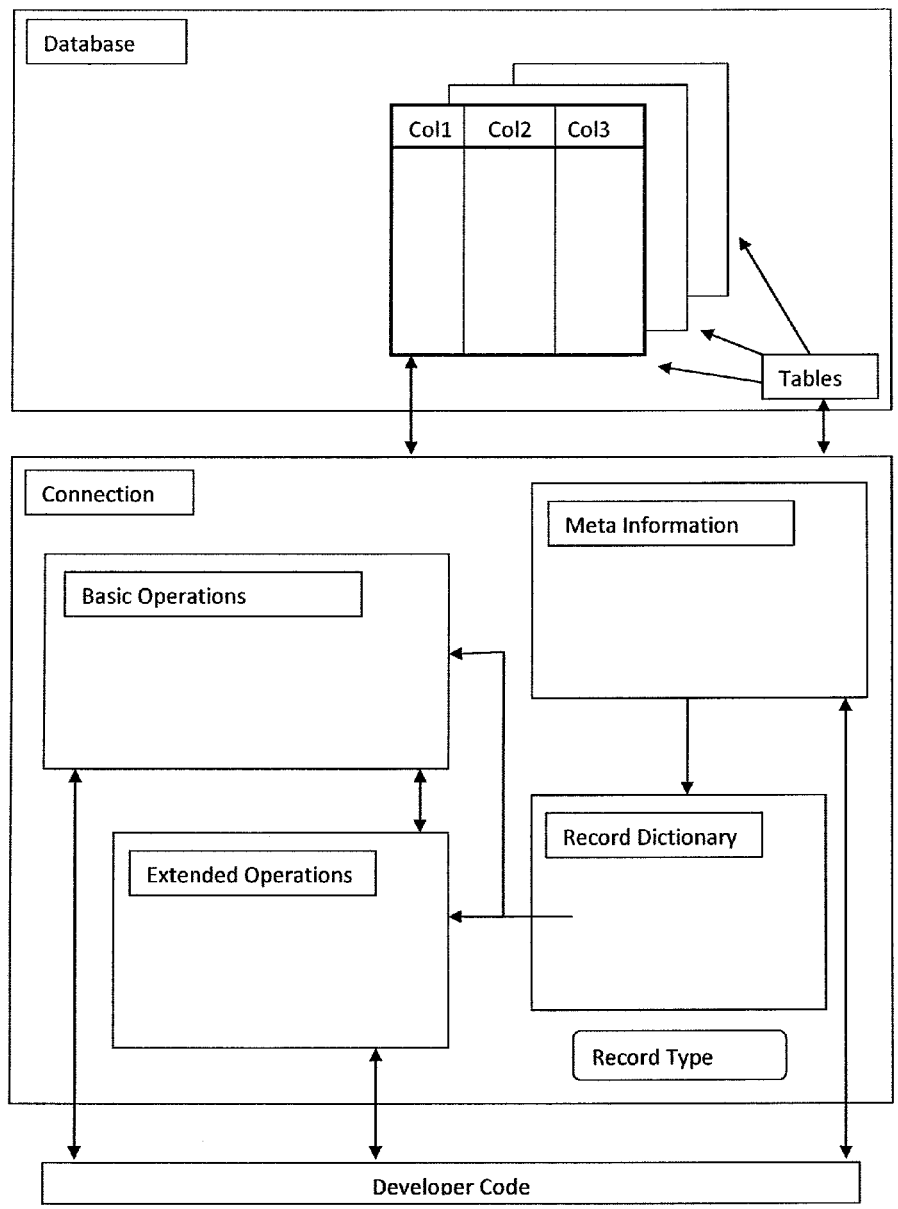
FIG. 17 is a diagram of an embodiment of a database abstraction framework.

A diagram of the described database abstraction framework is shown in FIG. 17 that is capable of supporting all of the above-described approaches for retrieving and using records. This framework distinguishes itself from prior art systems and frameworks, which are much more elaborate, supporting complex caching schemes or mirror object relationships based on relationships in the database. The overhead of these approaches is too large, especially when dealing with large scale databases. In most prior art approaches, annotated classes are used to specify persistent objects. Even though tools exist to generate these annotated classes automatically, when database changes start happening, these classes become difficult to maintain. Because of the complexity of these systems, it can be difficult to debug them when mistakes are made in annotations.

The described framework is very lightweight, so it can be applied to large scale databases without any worries about the size of its footprint. Rather than concentrating on extracting complex object relationships from the database, the described framework has been designed with scalability in mind. Unlike most existing approaches, the described framework is capable of dealing with Records in a dynamic fashion, with no annotations necessary.

Abstraction of Logical Entities

At the software application level, data needs to be accessed, created, modified, deleted and otherwise managed in bundles of information parts or fields that belong together. This logical collection of fields is frequently referred to as an entity. Unfortunately all data belonging to an entity might not always be stored within the same Record. For example, in an SQL database, an entity might be distributed over multiple tables. If during entity management the framework does not take this into account, the framework might produce data inconsistencies (e.g. removing a row from one table but not another). The entity design abstracts and encapsulates both the record data and the functionality to manipulate them.

Entity

An Entity is an object in the framework that contains:
All Records which together form the entity. The records may be referred to as sources. An Entity may have one or more associated record sources.
A meta entity object called a MetaEntity. The MetaEntity is further described below. It contains meta-information about the used records. The MetaEntity object may be referred to as an entity reference.
Functions to set and get source records and retrieve the count of source records.
Functions to set and get the MetaEntity object.
Functions to set and get field values in the underlying source records. A prefix is used to distinguish fields stemming from different record sources.
Functions to get column names and column types.
Functions to query field attributes and check if a column is hidden, computed, editable, present, a primary key or a foreign key.
Function to retrieve primary key columns.
Function to mark a column as changed.
Functions to retrieve and set the underlying primary keys.
Functions to check if the entity has been loaded from the database or newly created.
Load, a function to load the entity records from a provided Connection object.
Save, a function to save the entity records from a provided Connection object.
Delete, a function to delete the entity records from a provided Connection object.
UpdateIfChanged, a function to update each entity record that has changed.
UpdateFrom, a function to update an Entity using another entity of the same type.
A function to notify EntityAdjusters, which are entity adjuster objects that perform changes to Entities. EntityAdjusters are explained in more detail below. EntityAdjusters are maintained in the MetaEntity. EntityAdjusters are notified prior and after changes in the life cycle of an entity. They are used to facilitate customized field changes for instance prior or after deletion of an entity.

Figure 18:
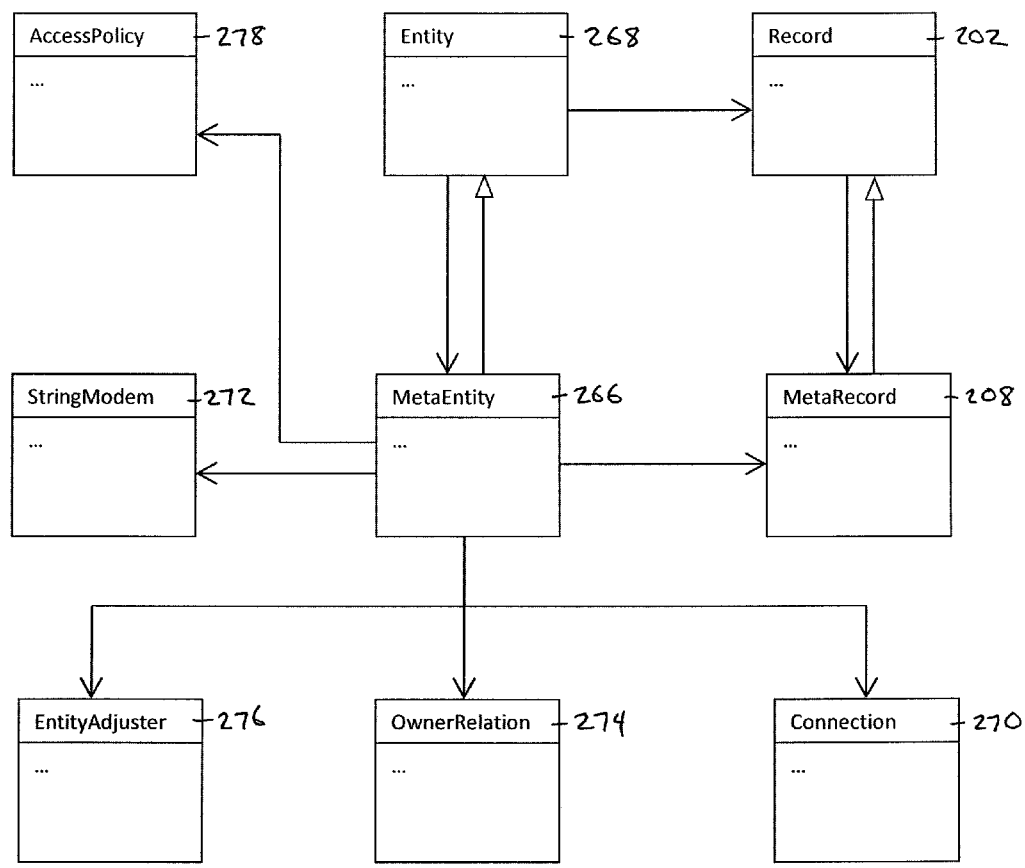
FIG. 18 is a unified modeling language diagram of an embodiment of an entity class.

The Entity combines access to the records as well as functions to manipulate the records. It can be understood as an additional layer of abstraction on top of the architecture discussed in the previous section. A UML diagram of the Entity class and its related classes is shown in FIG. 18.

MetaEntity

A MetaEntity 266 inherits the Entity class 268. The records in a MetaEntity 266 are MetaRecords 208 corresponding to the Records 202 used by the underlying Entity object 268. The MetaEntity object 266 contains:
A Connection object 270.
A name of the MetaEntity.
A list of MetaRecords 208 for each Record 202 used in the Entity 268.
A name of the object which originated the MetaEntity 266.
Ability to set and retrieve captions for the columns in the Entity 268.
A set of columns which is selected by default.
A list of strings specifying the preferred ordering when queries are returned.
Regular expression patterns to be used to validate columns.
A collection of string modem objects which are referred to as StringModems 272. StringModems 272 are capable of decoding field values to strings and also encoding strings to field values. The MetaEntity 266 contains a collection of default String Modems 272. For instance, when an integer is encountered, it is converted to a string. In addition to the default StringModems 272, it is possible to install custom StringModems 272. This allows textual representation to be customized when necessary.
Functions that utilize the underlying StringModems 272 to convert field values to strings and the other way around.
A list of owner relation objects which are referred to as OwnerRelations 274, specifying how the Entity 268 is related to sub-entities.
A collection of lookups, restricting the values of specific columns.
A list of static conditions on instance values which are used for filtering records.
A list of values to use to preset fields in newly created Entities 268.
One or more EntityAdjuster objects 276 which are notified whenever changes in an Entity life cycle occur.
An access policy object, or AccessPolicy, 278 regulating the access to the Entity 268.

The MetaEntity 266 carries a signaling facility to notify any interested listeners when something happens to the state of any Entity instance. Additionally, the MetaEntity 266 will host operators (via the EntityAdjuster object 276) that are invoked during the lifecycle of an Entity instance to populate or modify field content just before or after an event like removal or modification.

EntityAdjuster

The EntityAdjuster 276 is an interface which has a function to adjust a record 202, given the entity 268 and the occurrence of an event. Events are specified by before and prior to changes in the state of the entity. For example, an EntityAdjuster 276 can concatenate two fields prior to saving the entity 268.

OwnerRelation

An OwnerRelation 274 is an object linking two entities 268 into a parent-child relationship. It is created by specifying a parent MetaEntity 266 and a child MetaEntity 266 along with the two fields by which they are linked. The OwnerRelation 274 also contains information about the type of join that is desired between the two Entities 266 (in the case of a SQL-based connection). The OwnerRelation 274 can be used to link Entities 268 if the need arises.

Entities 268 and MetaEntities 268 rely on Records 202 and MetaRecords 208 and provide an additional abstraction layer. The added abstraction layer has several advantages. It allows logical entities to be comprised of one or more objects. It abstracts away functionality from the underlying connection. As a result, a developer does not have use the Connection Object directly. This makes development efforts easier.

Just like Records 202 and MetaRecords 208 can be generated dynamically from the database by using a ConnectionDef, one can similarly construct MetaEntities 266 and Entities 268 in a dynamic fashion, by simply providing the name(s) of the underlying table(s).

The database layer framework can be used on any computer processing device, including, without limitation, laptops, workstations, servers, and mobile devices. The framework can be implemented in Java, C# or any language that supports reflectance, and the framework can be used with any underlying relational database. It can also be used on distributed databases or non-relational databases as long as the Connection Interface is implemented for each type of connection.

Figure 19:
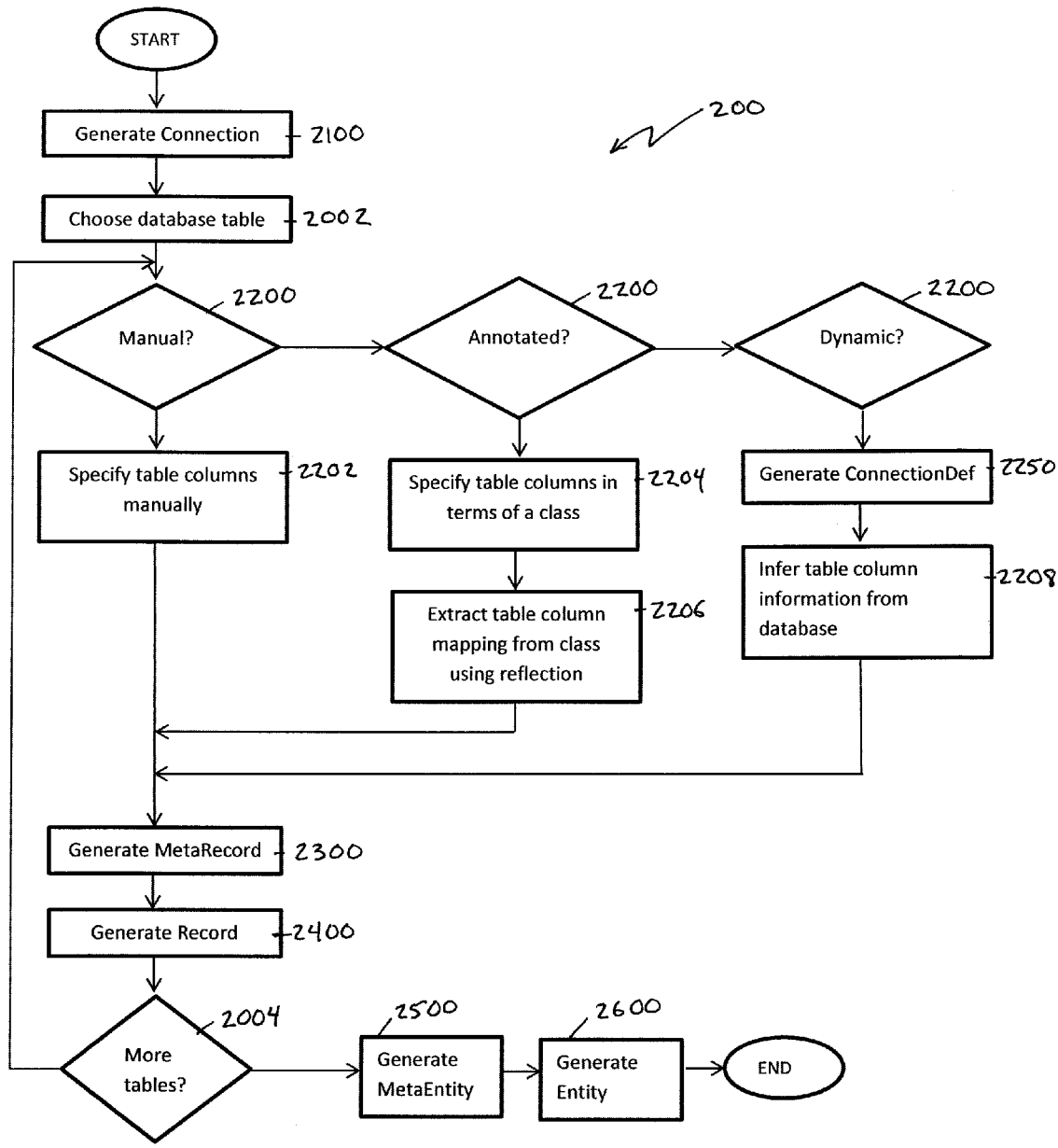
FIG. 19 shows an embodiment of a process for creating an abstract persistence layer.

FIG. 19 shows an embodiment of a process for creating an independent, dynamic, and abstract database layer 200 comprising the steps of generating a connection 2100, choosing a database table 2002, determining whether to create, access, and delete records manually, with annotations, or dynamically 2200, specifying table columns manually 2202 in the manual method, specifying table columns in terms of a class 2204 and extracting table column mapping from a class using reflection 2206 in the method with annotations, and generating a ConnectionDef 2250 and inferring table column information from the database 2208 in the dynamic method; generating a MetaRecord 2300, generating a Record 2400, determining whether there are more tables 2004, generating a MetaEntity 2500, and generating an Entity 2600.

Figure 20:
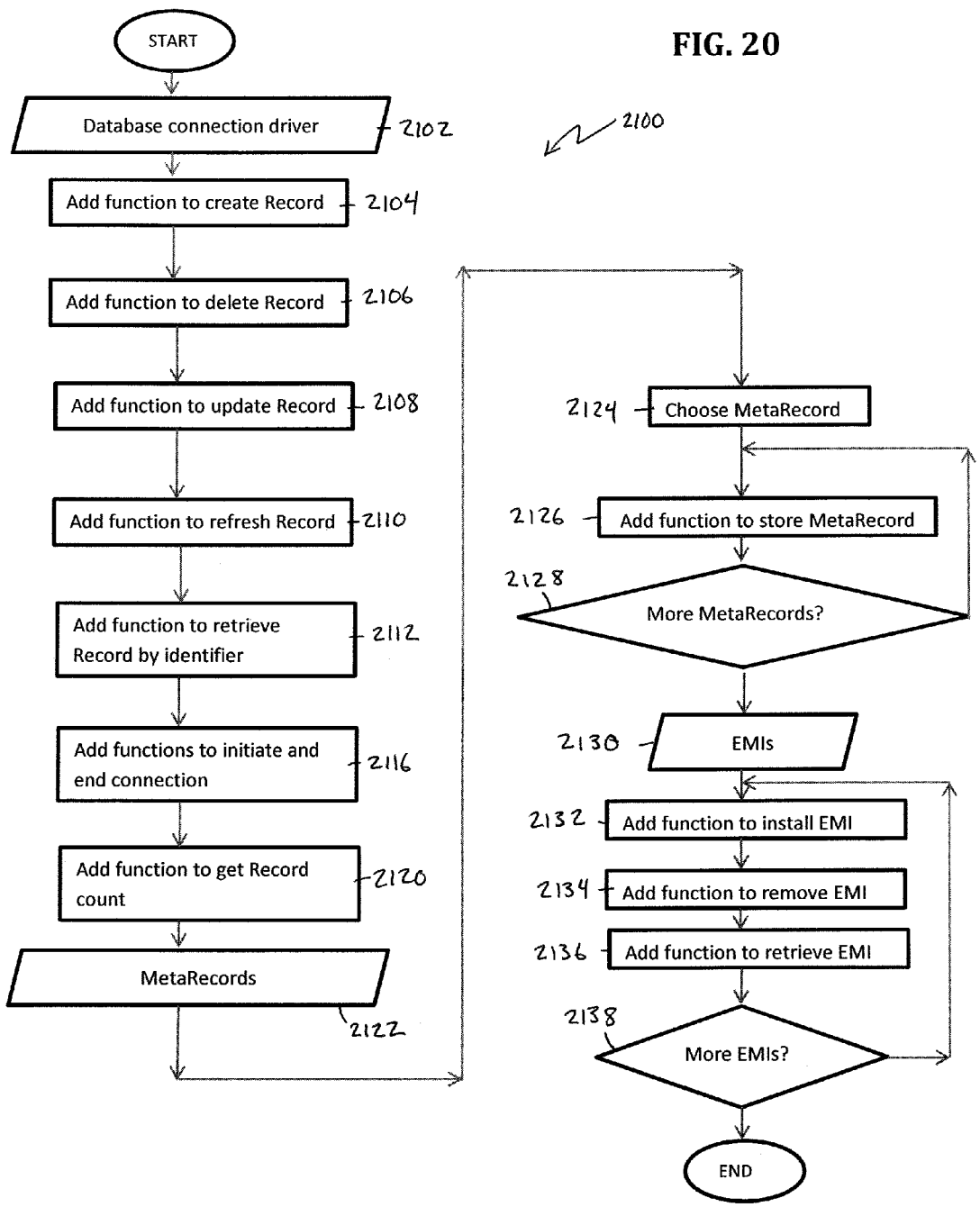
FIG. 20 shows an embodiment of a process for generating a database connection in an abstract database layer.

FIG. 20 shows an embodiment of a process for generating a Connection 2100 comprising the steps of inputting a database connection driver 2102; adding functions: to create a Record 2104, to delete a Record 2106, to update a Record 2108, to refresh a Record 2110, to retrieve a Record by identifier 2112, to initiate and end a connection 2116, to get a Record count 2120; inputting one or more MetaRecords 2122; choosing a MetaRecord 2124; adding a function to store a MetaRecord 2126; determining whether additional MetaRecords exist 2128; inputting one or more EMIs 2130; adding a function to install an EMI 2132; adding a function to remove an EMI 2134; adding a function to retrieve an EMI 2136; and determining whether there are additional EMIs 2138.

Figure 21:
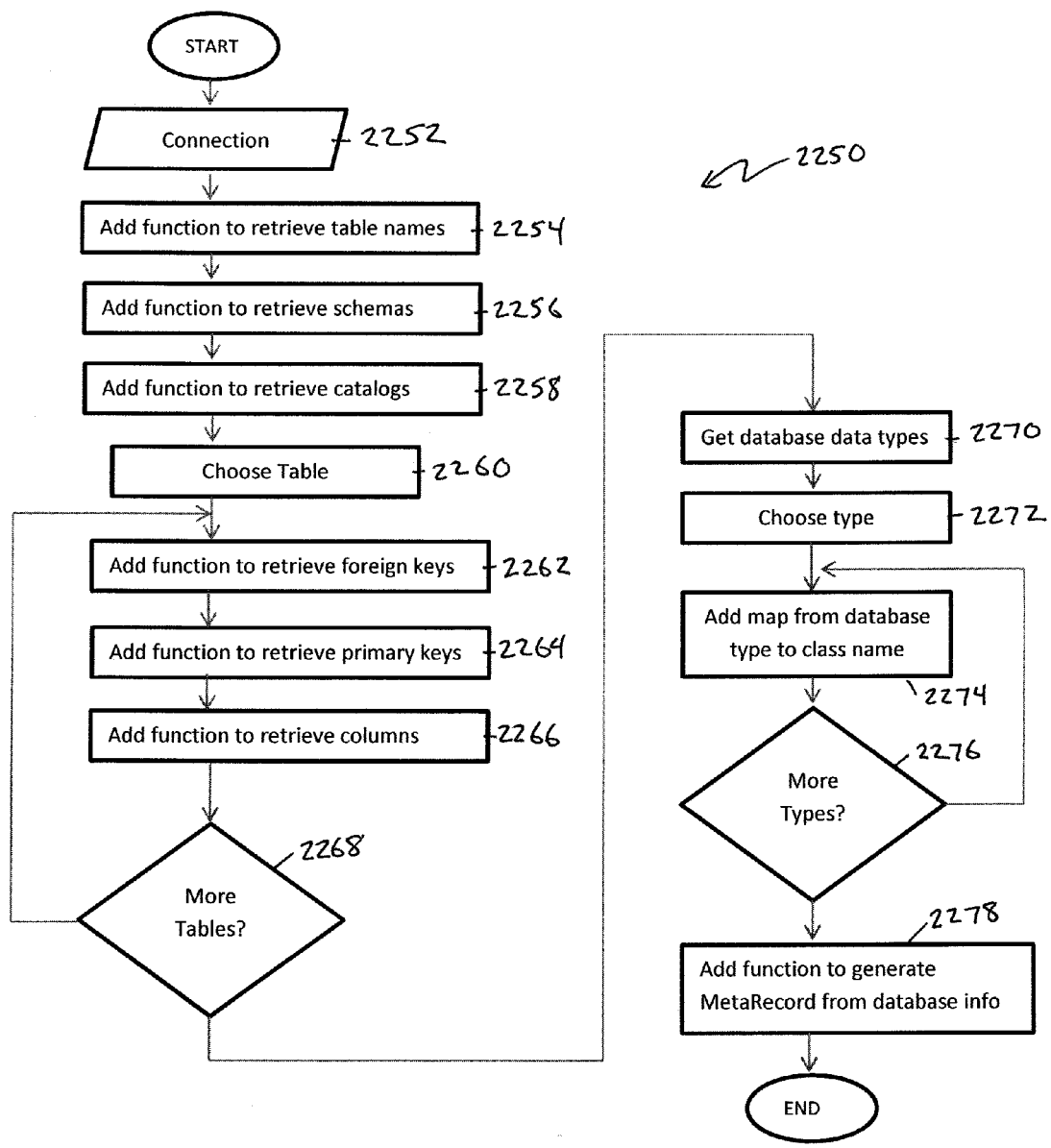
FIG. 21 shows an embodiment of a process for generating a database connection definition in an abstract database layer.

FIG. 21 shows an embodiment of a process for generating a ConnectionDef 2250 comprising the steps of establishing a connection 2252, adding a function to retrieve table names 2254, adding a function to retrieve schemas 2256, adding a function to retrieve catalogs 2258, adding a function to choose a table 2260, adding a function to retrieve foreign keys 2262, adding a function to retrieve primary keys 2264, adding a function to retrieve columns 2266, determining whether more tables exist 2268, getting database types 2270, choosing a database type 2272, adding a map from a database type to a class name 2274, determining whether more database types exist 2276, and adding a function to generate a MetaRecord from database information 2278.

Figure 22:
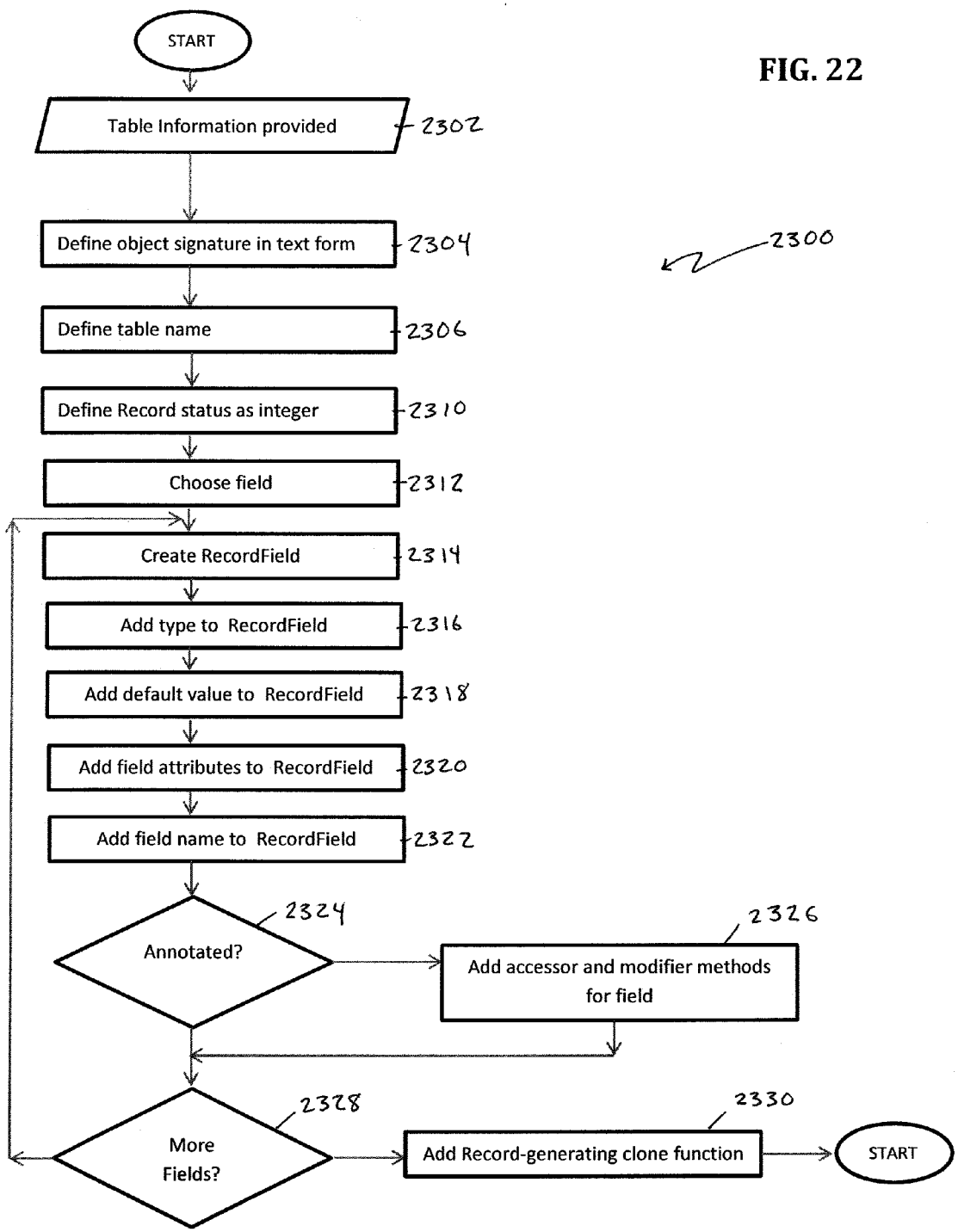
FIG. 22 shows an embodiment of a process for generating a meta record in an abstract database layer.

FIG. 22 shows an embodiment of a process for generating a MetaRecord 2300 comprising the steps of inputting table information 2302, defining an object signature in text form 2304, defining a table name 2306, defining a record status as an integer 2310, choosing a field 2312, creating a RecordField 2314, adding a type to the RecordField 2316, adding a default value to the RecordField 2318, adding field attributes to the RecordField 2320, adding a field name to the Record Field 2322, determining whether annotations exist 2324 and if so adding accessor and modifier methods for the field 2326, determining whether more fields exist 2328, and adding a Record-generating clone function 2330.

Figure 23:
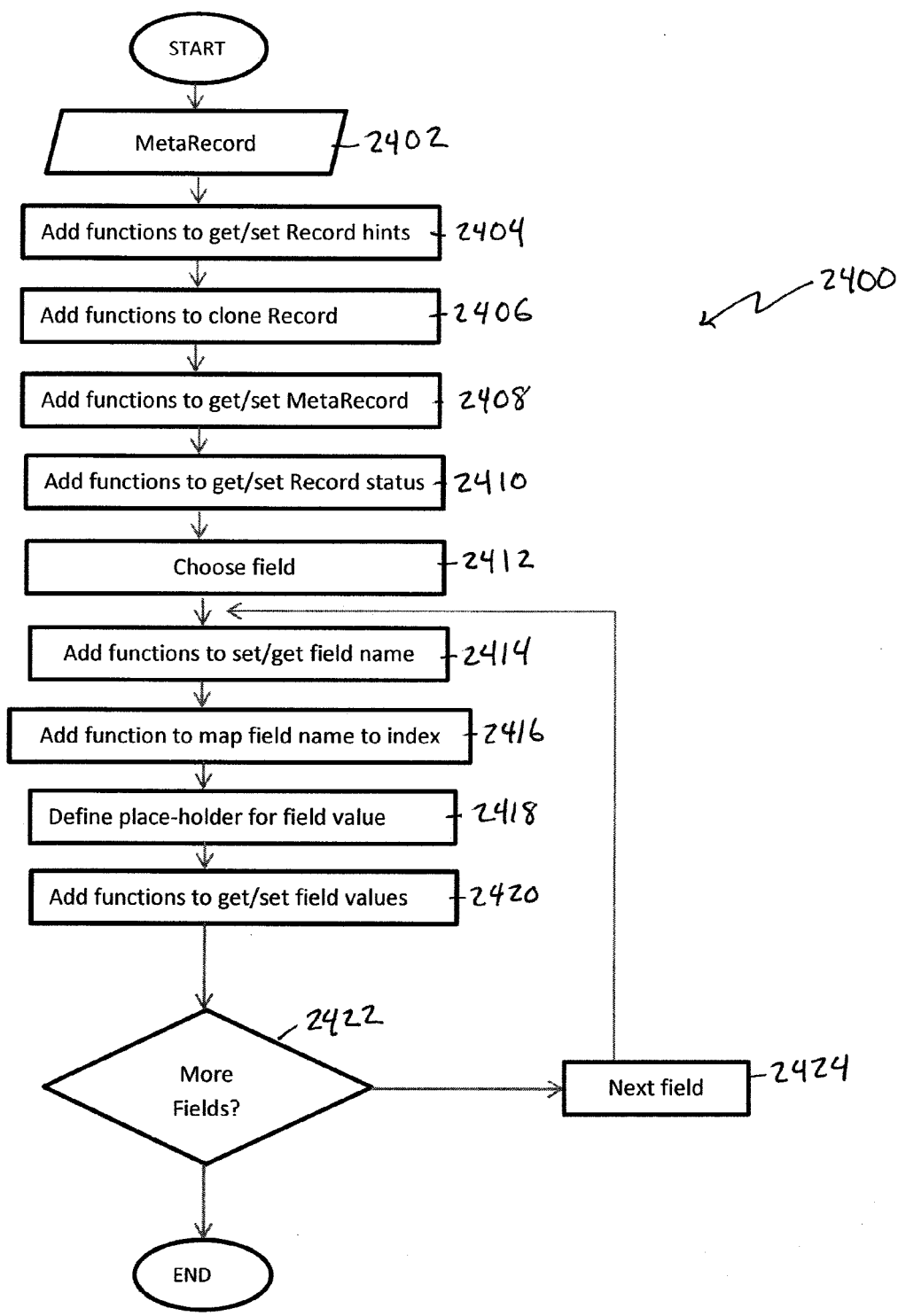
FIG. 23 shows an embodiment of a process for generating a record in an abstract database layer.

FIG. 23 shows an embodiment of a process for generating a Record 2400 comprising the steps of inputting MetaRecord information 2402, adding functions to get and set Record hints 2404, adding functions to clone a Record 2406, adding functions to get and set MetaRecord information 2408, adding functions to get and set Record status 2410, choosing a field 2412, adding functions to get and set the field name 2414, adding functions to map the field name to an index 2416, defining a place-holder for the field value 2418, adding functions to get and set field values 2420, determining whether more fields exist 2422 and if so advancing to the next field 2424.

Figure 24:
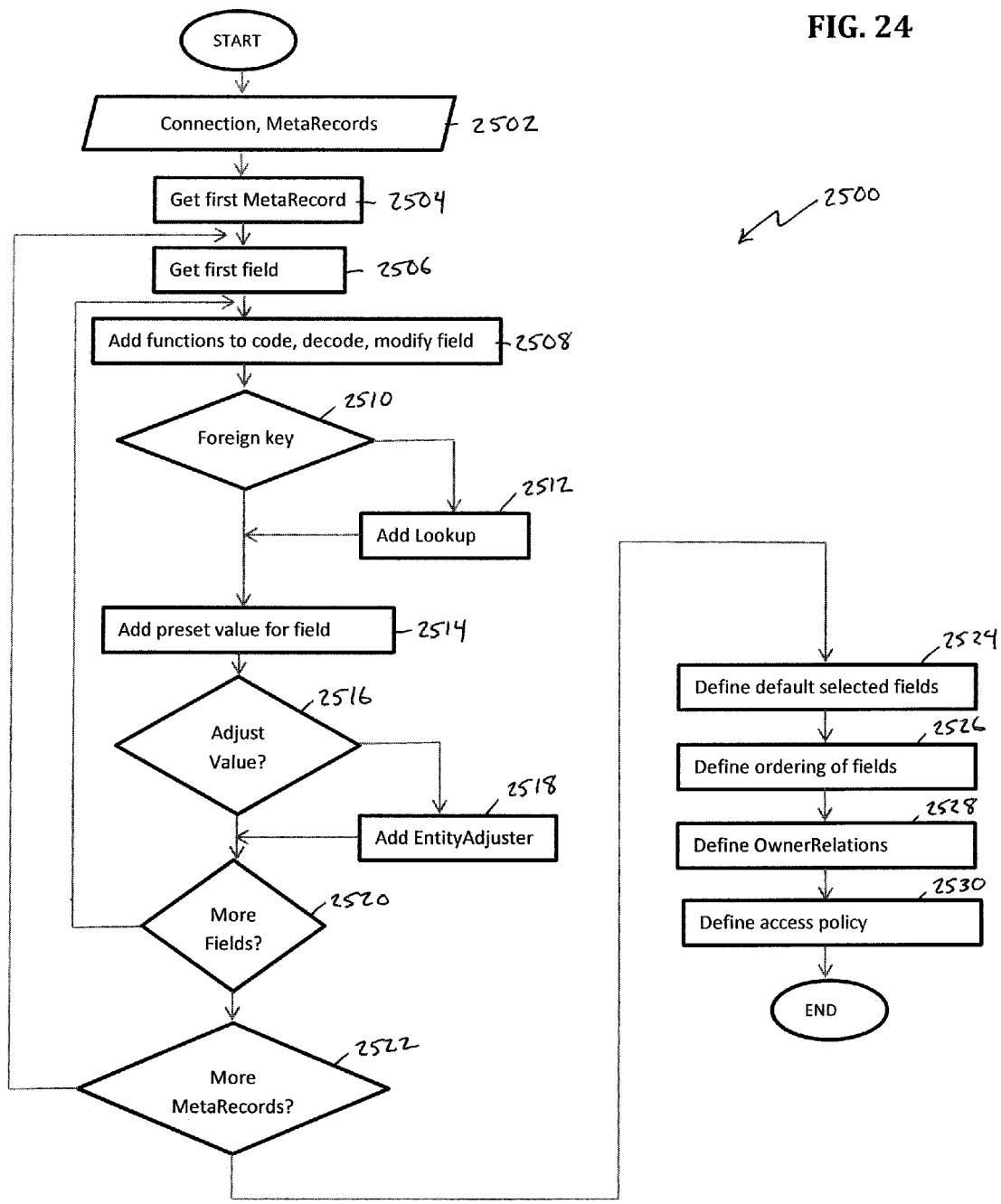
FIG. 24 shows an embodiment of a process for generating a meta entity in an abstract database layer.

FIG. 24 shows an embodiment of a process for generating a MetaEntity 2500 comprising the steps of inputting Connection and MetaRecords information 2502, getting the first MetaRecord 2504, getting a first field 2506, adding functions to code, decode, and modify the field 2508, determining whether a foreign key exists 2510 and if so adding a lookup 2512, adding a preset value for the field 2514, determining whether the field value requires adjustment 2516 and if so adding an EntityAdjuster 2518, determining whether more fields exist 2520, determining whether more MetaRecords exist 2522, defining default selected fields 2524, defining the ordering of fields 2526, defining OwnerRelations 2528, and defining an access policy 2530.

Figure 25:
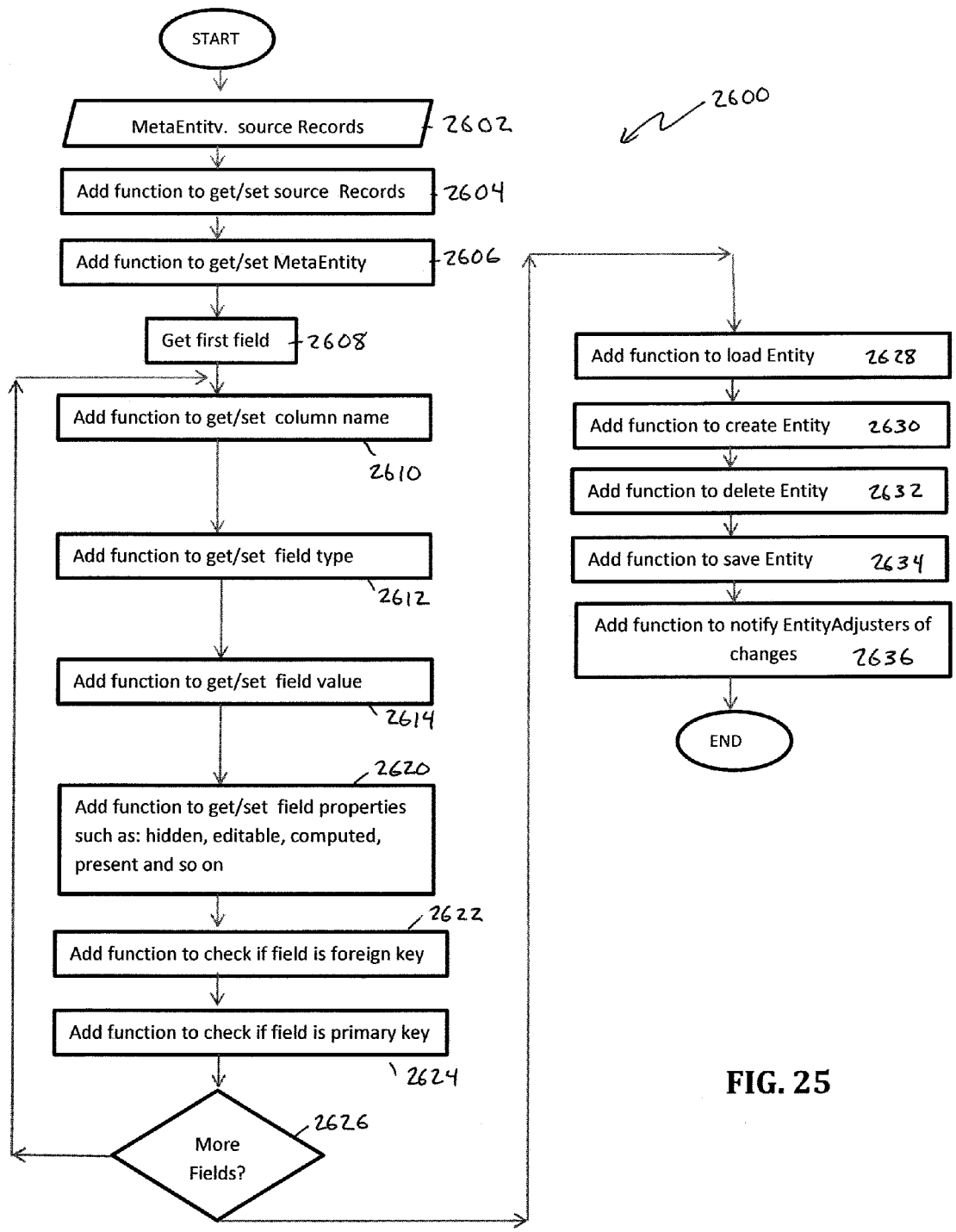
FIG. 25 shows an embodiment of a process for generating an entity in an abstract database layer.

FIG. 25 shows an embodiment of a process for generating an Entity 2600 comprising the steps of inputting MetaEntity and source Records information 2602, adding functions to get and set source Records 2604, adding functions to get and set MetaEntities 2606, getting a first field 2608, adding functions to get and set a column name 2610, adding functions to get and set a field type 2612, adding functions to get and set a field value 2614, adding functions to get and set field properties 2620, add a function to check if a field is a foreign key 2622, add a function to check if a field is a primary key 2624, determining whether more fields exist 2626, adding a function to load an Entity 2628, adding a function to create an Entity 2630, adding a function to delete an Entity 2632, adding a function to save an entity 2634, and adding a function to notify EntityAdjusters of changes 2636.

Database-driven applications by their nature are required to facilitate the management of data records. This typically includes the ability to view and search lists of records as well as to create, delete, and modify records. To avoid the need to re-implement these basic management tasks for every newly developed application and every record type, the system has abstracted these management tasks. Facilitating the management of records does not only include a programmatic interface and the logic to do it, but a user interface as well. The proposed system is capable of providing user interface components to manage any given data record. The goal and advantage of the proposed system is to streamline the development for data-driven applications and provide generic and extensible components for managing data records. The purpose of system is to facilitate various management tasks that pertain to data records. This includes:

The ability to retrieve and present a list of data records. The list of records would in most cases show only a subset of available fields or some sort of record summary.

The ability to specify which fields a user would like to be visible in a listing of records in terms of a filter. A filter accepts conditions to narrow down the displayed data and determines what fields to sort by or group by, whereby the filter options can be stored in a database. A user should be able to specify multiple such filters and switch between them when viewing records.

The ability to sort records and select one or more records.

The ability to apply operations to selected records or standalone operations. For instance operations such as Delete, Edit or Create New.

The ability to specify arbitrary search parameters and retrieve a subset of available records. For fields which denote foreign keys, a selection would appear automatically. For example if a parameter for the field state exists, it should automatically come up as a selection of available states, without any added programming effort.

The ability to open up a record and view and modify all of its details. This provides a listing of all of the available and relevant fields. The detail view of a record makes it possible to change fields. This is also the view in which records can be created.

In addition to providing the ability to modify and view all fields of a record, a detail also has the ability to maintain a sub-listing of records. For example, a company record might have contact sub-records. The objective is to be able to include sub-records into a detail, without any added programming effort. It should be possible by simply indicating how the parent record is related to the child field, in terms of the field connecting them.

The database record management system has two layers to it. One provides the logic that is necessary to facilitate the above tasks. Objects in this layer are referred to as models. The second part of the system is concerned with the user-interface representation of the underlying models. The user interface components are referred to as views. Views present the model information to the user and delegate requested logical operations to the model.

The two principal objects in the model layer are a Directory and a Detail. The Directory is responsible for managing lists of records, while the Detail is responsible for managing a single record.

The Directory

Figure 26:
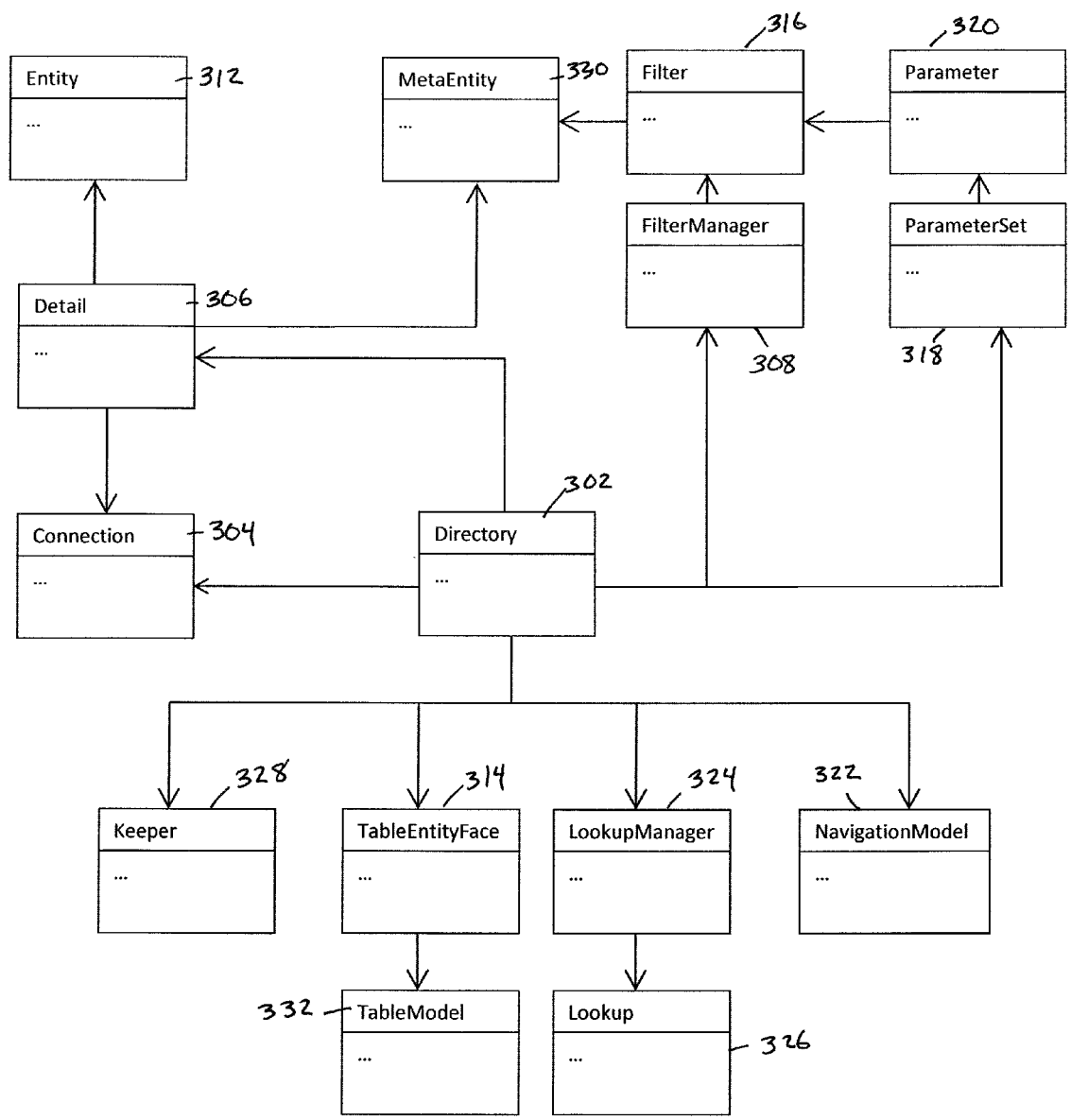
FIG. 26 is a unified modeling language diagram of a directory and its related classes.

FIG. 26 shows a UML diagram of the directory 302 and its related classes. The directory is the main model object because it brings together all of the other models. A Directory 302 comprises the following:

A Connection object 304 representing the database connection. The connection is capable executing queries against an underlying database.

A Detail object 306, capable of loading, creating, deleting and otherwise manipulating a given data entity. Once a particular data entity is selected in the Directory 302, it is loaded inside the Detail object 306.

A FilterManager 308 is a filter manager object containing a list of Filters 310. A Filter 310 is an object capable of generating queries for a particular Entity 312. A Filter 310 specifies which fields should be visible in a listing and what sorting or grouping should be used. A Filter 310 can also specify conditions that should be applied.

A table entity face object, or TableEntityFace, 314. This is an abstraction of a table, and it maintains a list of records, whereby not necessarily all Entity 312 fields are included.

An SQL Cursor (not shown) and paging mechanism capable of retrieving a sub-range of records when a query is executed. A Directory 302 does not retrieve the entire record listing in one shot. In applications where there are millions of records, this would not be possible. Instead the Records are retrieved in pages. A developer or user can specify a page size. The total number of records is divided into these pages. An SQL Cursor is used to retrieve a page of records.

A parameter set object, or ParameterSet, 318. This object holds any parameters 320 that might be passed along by the user. Parameters 320 represent conditions on fields that are present in a Record. For instance, in an address database, a particular state can be specified. The Directory 302 would take this condition into account when producing al of Records.

A navigation model object, or NavigationModel, 322. This object manages on which page the Directory 302 is currently. It provides the ability to switch between pages. When a switch is requested from the NavigationModel 322, the Directory 302 is notified.

A lookup manager object, or LookupManager, 324. A lookup manager provides lookups 326. Lookups 326 are objects that can be used to convert fields which are foreign keys into a textual representation. For instance, a company might be represented within a record as an integer. A lookup 326 would be installed to translate the integer to the actual company name.

A Keeper object 328. This object acts as a service keeper to the Directory 302. It has the capability to provide Models on request. For instance when the directory is created it may request a Detail model to deal with companies. The request would be formulated using a uniform resource identifier ("URI"), such as "/company/detail".

Directory Operation

The current range of Records is referred to as a "page." All of the Records are referred to as a "book."

Retrieving Records

Figure 27:
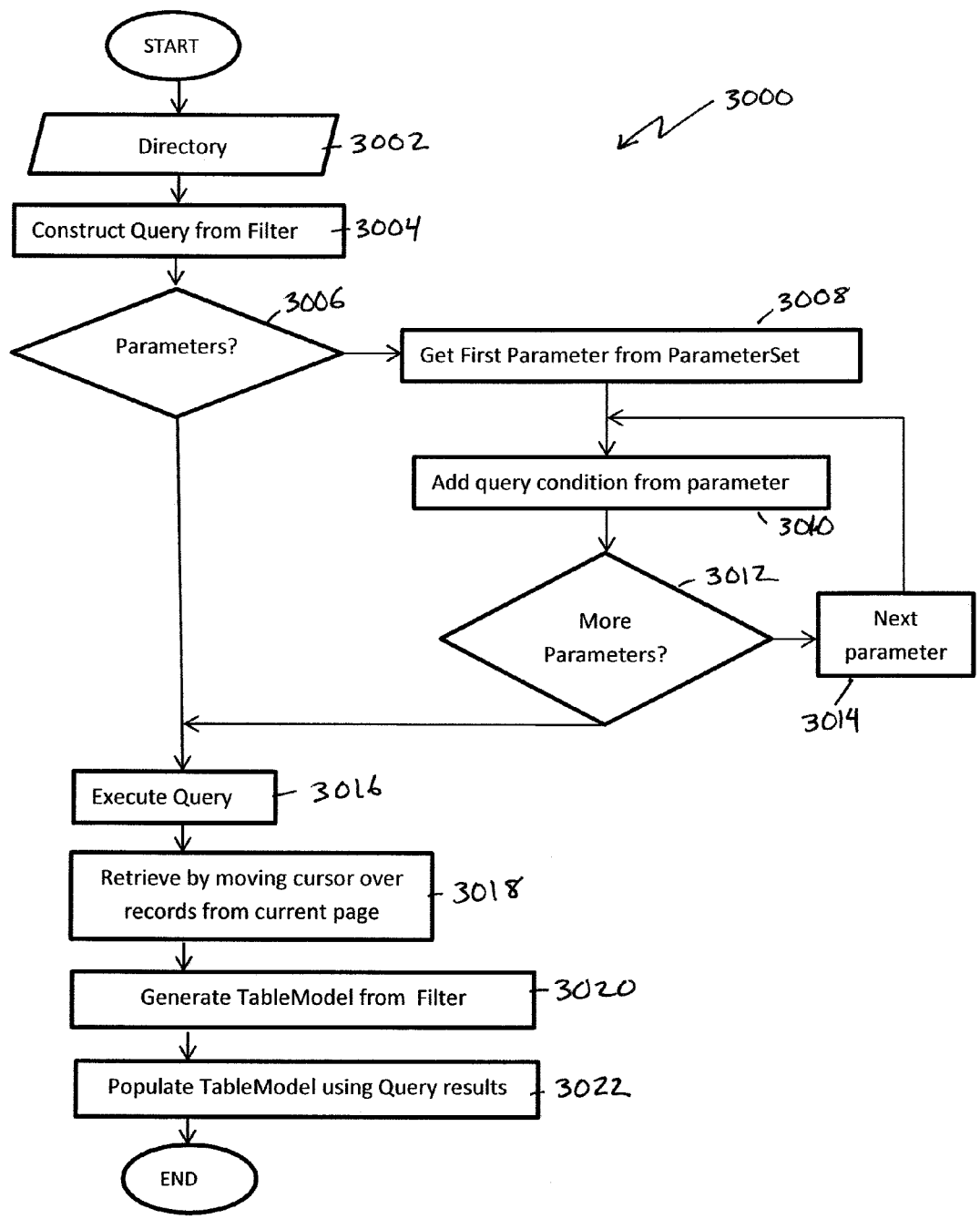
FIG. 27 shows an embodiment of a process for retrieving directory data.

FIG. 27 shows an embodiment of a process for retrieving directory data 3000 comprising the steps of connecting to a directory 3002, constructing a database query from a selected Filter 3004, determining whether any Parameters are in the ParameterSet 3006, and if so, getting a first Parameter from the ParameterSet 3008, adding a condition to the query statement 3010, determining whether additional Parameters exist 3012 and if so iterating to the next Parameter 3014, executing a query 3016, retrieving a record by moving a cursor over records in a page 3018, generating a table model, or TableModel, from the Filter 3020, and populating the TableModel using results from the query 3022.

For the step of constructing a database query from a selected filter 3004, special filter encoder objects called FilterEncoders are used. In embodiments operating in connection with SQL-based databases, a Filter is converted to an SQL statement.

When conducting the step of executing a query 3016, an SQL cursor, or SQ Cursor, is used to go to the first record specified by the current page. If there are 100 Records with a page size of 10, the second page would mean that the cursor would be placed on the $20^{th}$ Record.

For the step of generating a TableModel from the Filter 3020, the system first reads all fields from the Filter and their Types. The primary key is added as the first column, which is set as hidden. For each field specified in the Filter, the system adds a column to the TableModel and indicates visibility and the type of the data in the column.

For the step of populating the TableModel using results from the query 3022, the system first clears the TableModel contents, then the cursor is moved over records from the current page and the TableModel is populated with records.

Figure 28:
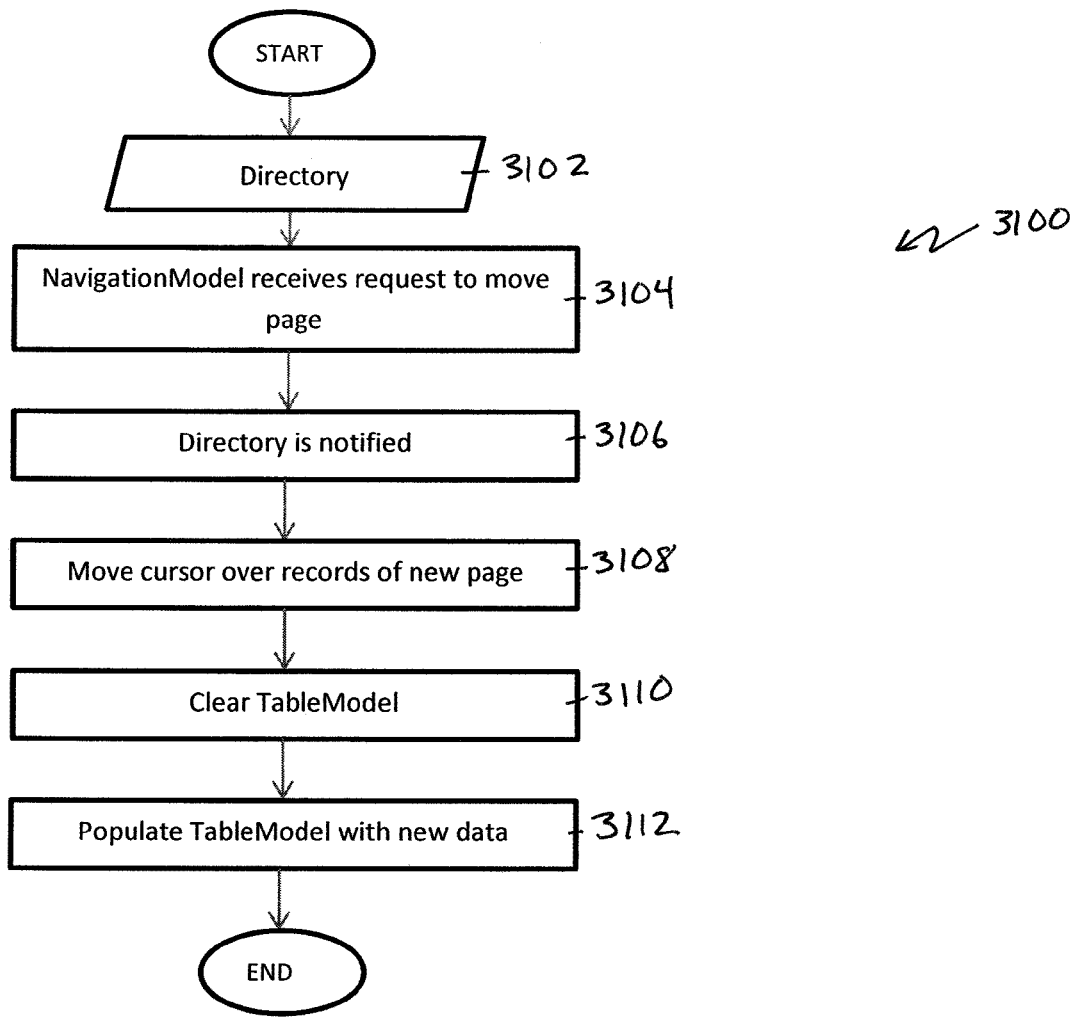
FIG. 28 shows an embodiment of a process for navigating data in a directory.

FIG. 28 shows an embodiment of a process for navigating or browsing data in a Directory 3100 comprising the steps of connecting to a directory 3102, instructing a NavigationModel object to move to a specific page 3104, notifying the Directory 3106, retrieving a record by moving a cursor over records in a new page 3108, clearing a TableModel 3110, and populating the TableModel with new data 3112.

In order for a user to create a new Entity, the Directory passes the request to a Detail object. In order to load an existing Entity, the Directory passes a primary key value to a Detail object.

The Detail

With reference again to FIG. 26, the Detail object 306 is responsible for operations on a single data Entity 312. The Directory 302 can be thought of as a listing of data Entities 312, and it may list a subset of the available fields. The Detail 306 provides the ability to manipulate all aspects of a given data Entity 312. It is comprised of:

- A Connection object 304 representing the database connection. The connection is capable executing queries against an underlying database.
- An Entity Object 312, holding one or more data Records (not shown). An Entity 312 represents a logical Entity. The Entity object 312 has the ability to hold Record data and synchronize it with the underlying database.
- A MetaEntity object 330. A MetaEntity 330 provides meta information about a record type. It contains all of the field names, field types, lookups and anything else that describes the Record Type. If the Entity object 312 is comprised of multiple record types, the MetaEntity 330 would hold the meta information for each one of them.
- Scope (not shown), an array of primary keys indicating what Records the Detail 306 is operating on.
- Status (not shown), indicating if the Detail 306 is being used either for COMPOSING, EDITING, or BULK_EDITING. This distinction is made to distinguish between creation of new Records, and records that have been loaded. Also, in the case that changes are applied to multiple records, a distinction has to be made in the user interface component.
- Functions to load, delete and save the underlying database records.
- Functions to modify and retrieve a given field.
- Functions to validate fields.
- Functions to convert field values to Strings and the other way around. This is needed because in a user interface eventually values are represented as Strings.
- Ability to retrieve lookups for fields.
- Ability to get and set field attributes such as, for example, Nullable, Editable, Changed, and Present.
- Ability to specify preset values for fields. These are used as default value when new Records are created.
- Functions to get and set sub-directories. A Detail 306 can have one or more sub-directories associated with it.
- Function to reload sub-directories.

A Detail 306 exposes all of the functionality needed to manipulate a data entity.

NavigationModel

The NavigationModel 322 is used in the Directory 302 to simply keep track of the page. It only contains state-relevant information. The actual retrieval of data is done within the Directory 302. The NavigationModel 322 contains:

- RecordCount.
- PageSize, the number of records per page.
- PageHistory, an array indicating a list of previous pages.
- A function to go to the first page.
- A function to go to the last page.
- A function to go to the previous or next page.
- A function to go to a specified page.
- A function to notify the Directory 302 that a change has occurred.

FilterManager

The FilterManager 308 facilitates the management of Filter objects 310. It provides functions to manipulate the underlying Filters 310. A Filter object 310 encodes various query options for a given Record type. The FilterManager 308 contains:

- A list of permitted operators such as "=", ">" or any custom operator which might be defined.
- A MetaEntity object 330 providing meta information about the underlying Record type, such as column names, column types and so on.
- Functions to set and get columns for a given Filter 310, which are all columns in a Filter 310.
- Functions to set and get preselected columns for a given Filter 310, these are columns which are selected by default and cannot be deselected by the user.
- Functions to set and get selected columns for a given Filter 310. These are columns that can be deselected by the user.
- Functions to set and get conditions for a given Filter 310. These are eventually turned into query conditions.
- Functions to set and get preconditions for a given filter 310. These are conditions which cannot be removed by the user.
- Functions to convert columns and conditions into Strings, and also import String descriptions of columns and conditions into Filters 310.
- Functions to create and delete Filters 310, with the ability to persist Filters 310 to a database.

Filter

A Filter 310 is an object representation of query of a given Record type. It contains:

- A MetaEntity 330, which describes meta information about the record type in question, such as columns, data types, and so on.
- OrderBy and OrderDirection, two lists indicating ordering preferences.
- GroupBy, a list indicating which fields to group by.
- Preselect columns, columns which are retrieved by default and cannot be deselected by a user.
- Selected columns, columns which can be deselected or selected by a user.
- Preconditions, a set of conditions that appear by default. The user does not have the ability to remove them.
- Conditions, a set of conditions specified by the user. The user has the ability to remove them.

ParameterSet

A ParameterSet 318 is an object which acts as the model for obtaining search parameters from the user. It allows for any field to be specified. In a DirectoryView, explained in detail below, parameter fields appear on the top. A ParameterSet 318 is comprised of:

- A Filter 310, which is used as the basis for this ParameterSet 318.
- A function to form a ParameterSet 318 from a given Filter 310, generating Parameters 320 for every relevant column.
- A function to retrieve the Lookup 326 for a given Parameter 320. This is relevant when dealing with values that represent foreign keys.
- Functions to export visible parameter conditions.
- Functions to export visible parameter values.

The exported values and conditions are used in query generation.

Parameter

A Parameter object 320 specifies a parameter condition for a specific field. It contains:
- A variable indicating its name.
- A value.
- A column name, for the column presented to the user.
- A column name, for the column used for storage.
- A Lookup object 326 if the value needs to be translated.
- An operator indicating the type of condition, for example the operator could be "=" or "LIKE."

The column name shown to the user and the column name stored might differ when dealing with foreign keys, where the presented version is textual while the stored value is numeric. In this case, a Lookup object 326 would also be used.

LookupManager and Lookup

The LookupManager 324 maintains a collection of Lookup objects 326. It provides the ability to add, get, remove and refresh Lookups 326. A Lookup object 326 is an association of value-name pairs. Lookups 326 are most frequently used to associate a foreign key column to a field in the foreign key table.

TableModel

A TableModel 332 keeps raw data in a tabular structure. It provides actions which can be defined on single row or multiple rows. It further contains:
- Row data—typically an array holding the actual data.
- Functions for adding columns by specifying name, caption and class.
- Functions to get and set values in the table given row and column index.
- The ability to attach annotation objects to table cells.
- Attributes indicating whether the table is selectable or editable. In a selectable table, the rows can be selected, and otherwise not. In a editable table the rows can be edited.

TableEntityFace

The TableEntityFace 314 is a wrapper around the TableModel 332. The TableEntityFace 314 also provides the ability to retrieve and set values, as well as column types. However, the difference with the TableEntityFace 314 is that it can add rows in terms of Record objects, rather than just raw data.

Keeper

As the name suggests, the purpose of a keeper object, or Keeper, 328 is to keep other objects or to generate them. Provided an object URI such as "/company/detail" or "/company/metaentity", the Keeper 328 is capable of retrieving the requested object. Model Keepers are maintained for objects specifically relevant for models, such as Directories 302, Details 306 and so on A Keeper 328 is also maintained for views. A Keeper 328 designated for views is able to retrieve Views for a given Model object.

Figure 29:
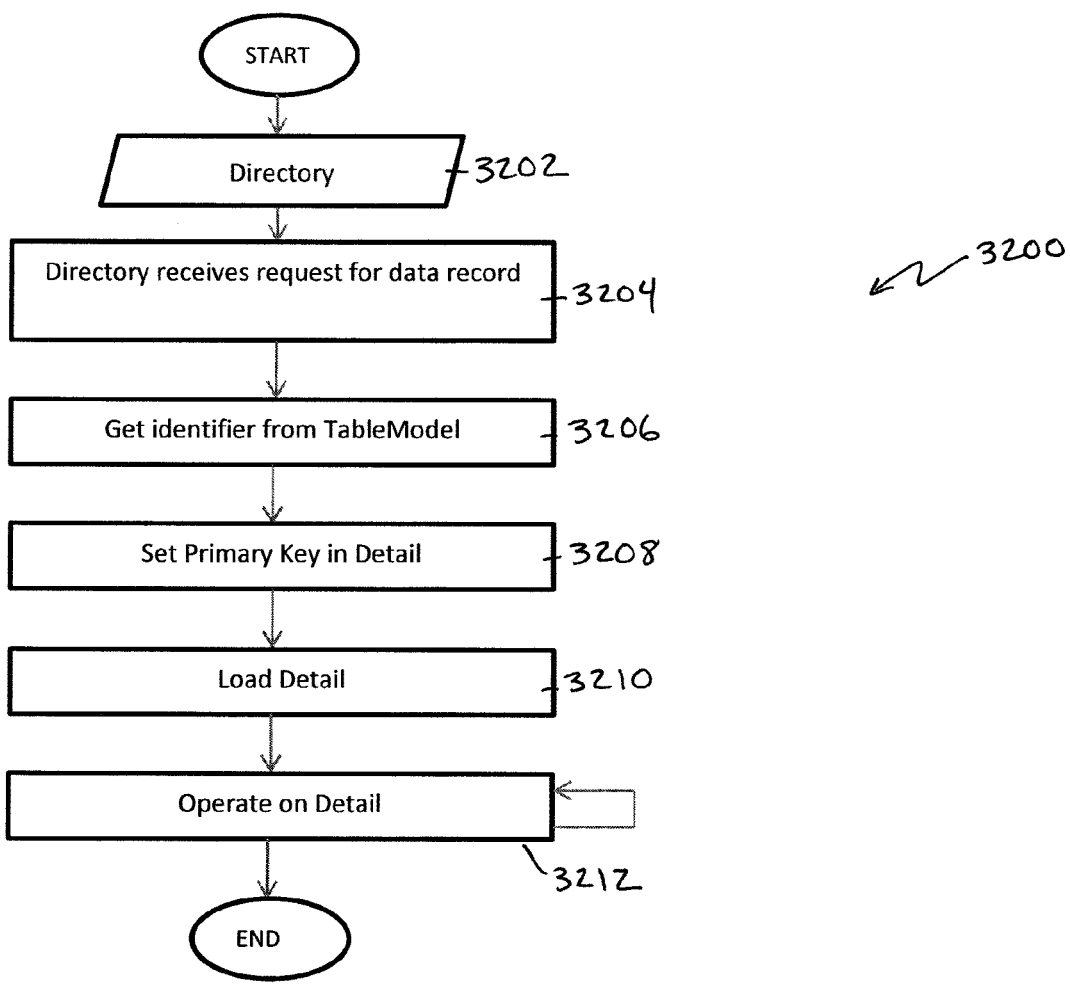
FIG. 29 shows an embodiment of a process for loading and operating on detail in a directory.

FIG. 29 shows an embodiment of a process for loading and operating on Detail in a Directory 3200 comprising the steps of connecting to a directory 3202, instructing a Directory object to obtain a data record 3204, getting an identifier from a TableModel 3206, setting a Primary Key in a Detail object 3208, loading a Detail object 3210, and operating on a Detail object 3212 by manipulating Detail contents including fields of the loaded entity object.

Views

Each View in the system is associated with an object from the Model layer. The Views themselves determine how to draw the model data. The views are very thin and do not contain any relevant logic or operations. The views only know how to draw themselves. They do however intercept user interactions and events and initiate actions in the model layer.

DirectoryView and its Subviews

Figure 30:
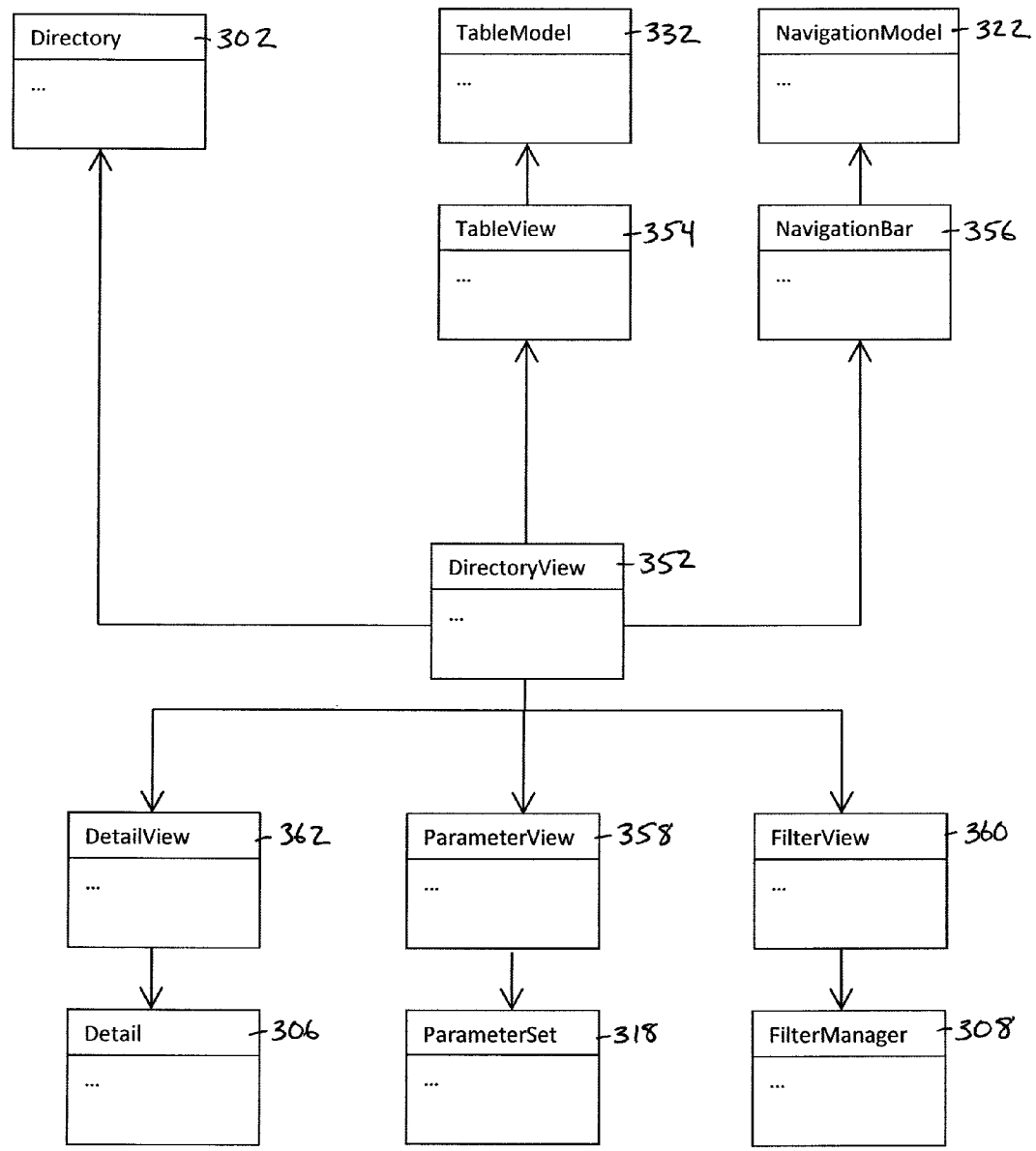
FIG. 30 is a unified modeling language diagram of a directory view class and its related classes directory.

FIG. 30 is a UML diagram of the directory view class, or DirectoryView, 352 and its related subclasses. The most central view is the DirectoryView 352. The DirectoryView 352 contains a number of sub-views. The table view object, or TableView, 354 draws a listing of records. Beneath it are pages of data. The navigation bar object, or NavigationBar, 356 is responsible for drawing the pages and initiating actions in the navigation model object, or NavigationModel, 322. Row and bulk actions in the TableView 354 initiate actions to create, delete, or edit records. At the top of a displayed page one can find Parameter fields. These are drawn by a parameter view object, or ParameterView, 358 which in turn is tied to the ParameterSet 318. Finally, there is a combobox showing different Views. The combobox displays a choice of Filters. Clicking on it opens up a filter view objet, or FilterView, 360, which is ultimately tied to the FilterManager 308.

Opening a DetailView

Once a record is clicked in the DirectoryView 352, a detail view object, or DetailView, 362 opens up. When the click occurs, the TableView 354 passes this action to the DirectoryView 352, indicating the id of the row that was clicked. The DirectoryView 352 in turn requests from the Directory model 302 to load a Detail 306 with the given primary key. Once the Detail 306 has been loaded, it is attached to a DetailView 362 as a model. The View is then requested to draw itself.

The DetailView

The DetailView 362 itself lists all of the Record fields in an accessible format. There are several implementations of the DetailView 362. One version simply lists all of the existing fields in a record in a grid-like layout. The layout only specifies the dimensions of the grid. Another implementation is based on an XML layout, whereby the locations and visual properties of the user interface are provided in an xml file. The XML layout also provides behavioral properties in terms of event scripts. A DetailView 362 that is defined to draw records in general, rather than specific fields only is advantageous because it can be used to draw generic records. If a developer is in need of customization, it can easily be done on top of the existing framework Handling of Search Parameters In reference to FIGS. 26 and 30, as described above, Parameters 320 are created based on Filters 310. When a condition in the FilterView 360 is added with a special value such as the "?" character, this is used as a trigger to generate Parameters 320. The DirectoryView 352 constructs a ParameterSet 318 based on the Filter 310. The Filter condition is taken over as a Parameter condition. The column name is carried over as well. Using the MetaEntity 330 from the Filter 310, one can also extract a Lookup object 326 if it exists. The next time the DirectoryView 352 is drawn, the ParameterView 358 is no longer empty. When a user enters a Parameter value, it is passed to the ParamterSet 318. The ParameterSet 318 in turn notifies the Directory 302 to reload its data.

Handling Record Operations

Row and bulk options are part of the TableModel 332. A row operation only allows one row to be selected. Once an operation such Create is clicked, the TableView 354 passes on this event to the DirectoryView 352 along with the selected ids in the Table. The DirectoryView 352 translates the table ids to primary keys and passes on the action in most cases to the Detail model 306. Once the operation is completed, either the DirectoryView 352 is redrawn or a DetailView 362 is opened.

Figure 31:
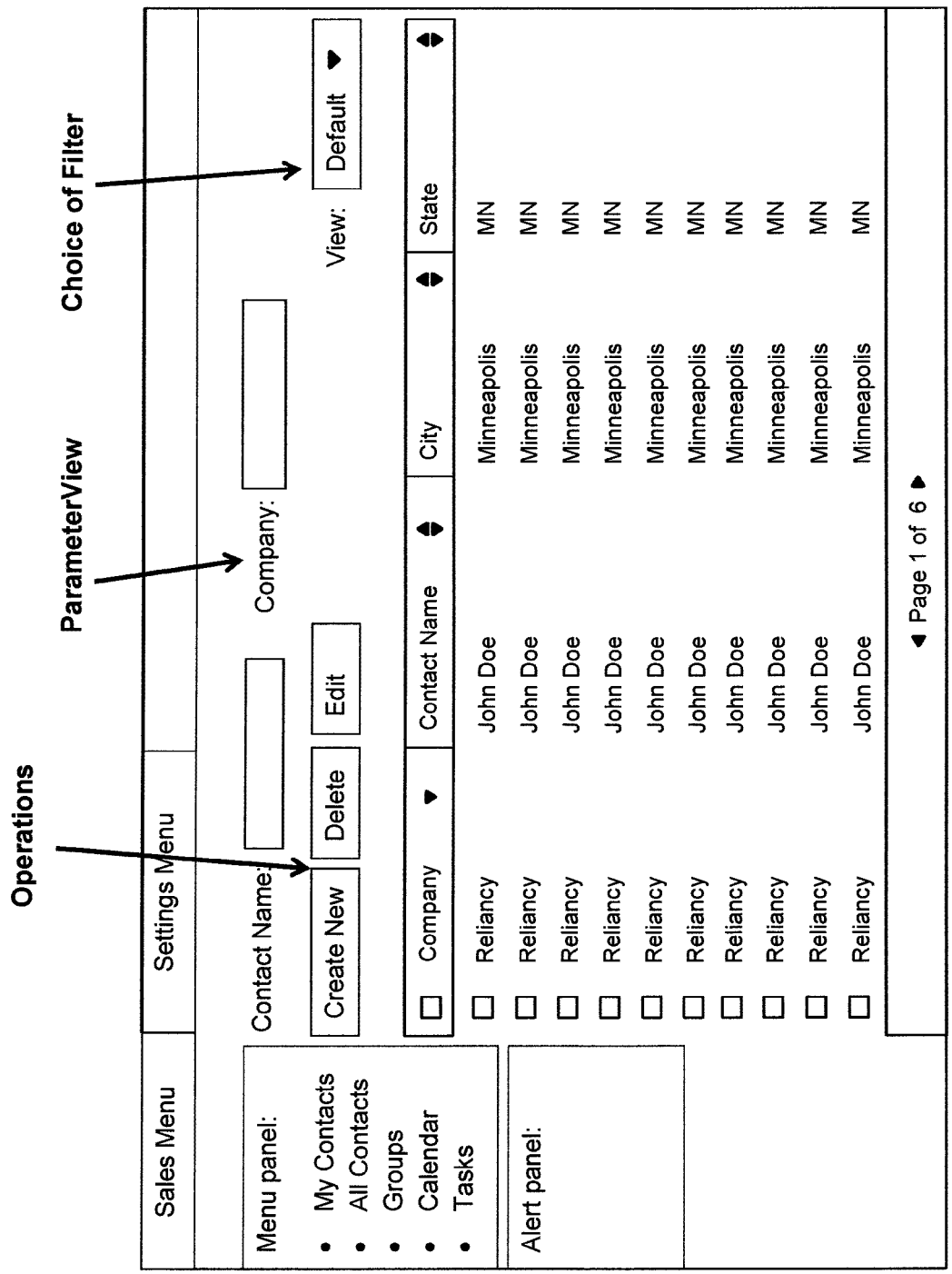
FIG. 31 is an example of a directory view in HTML.
Figure 32:
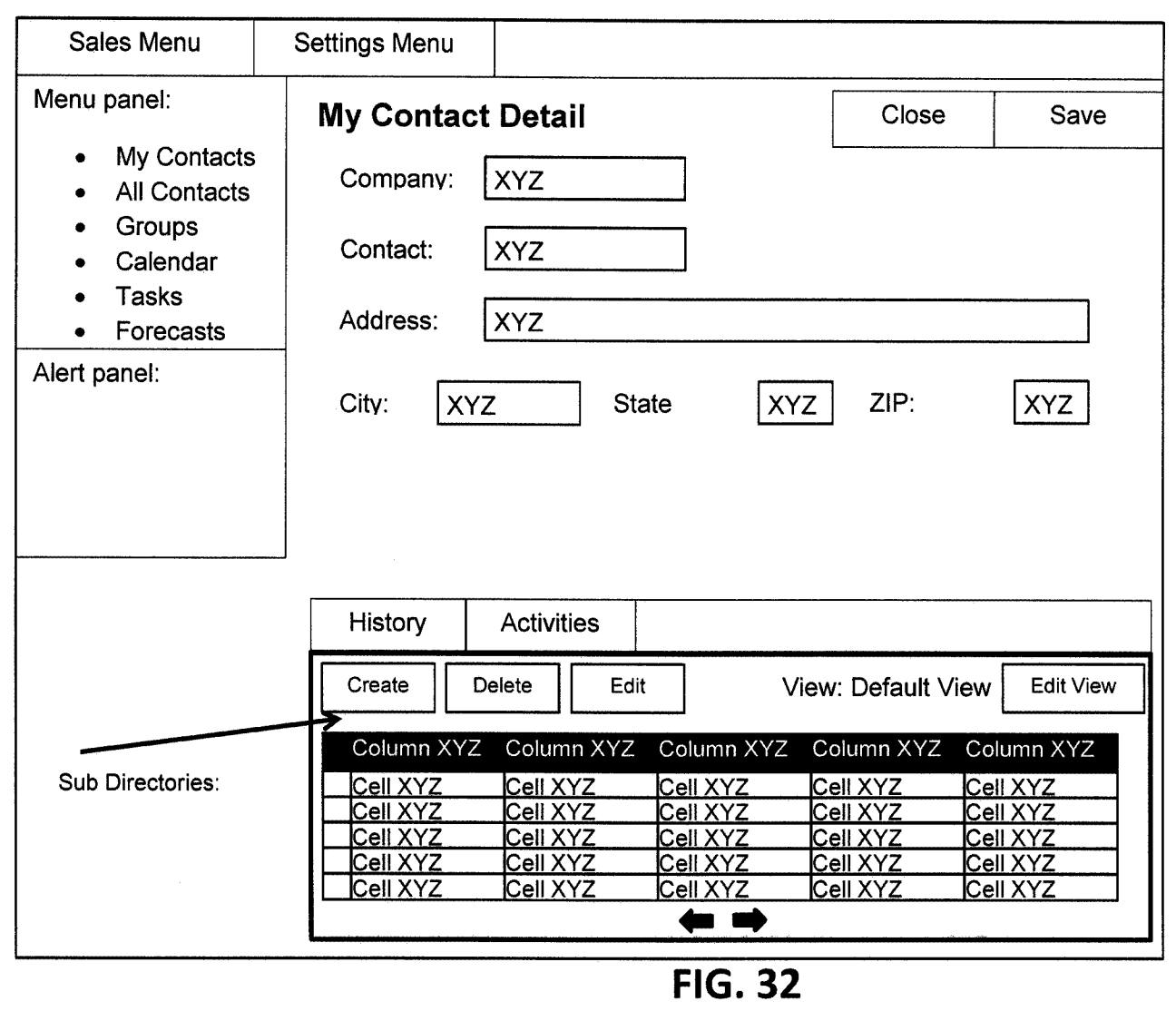
Figure 33:
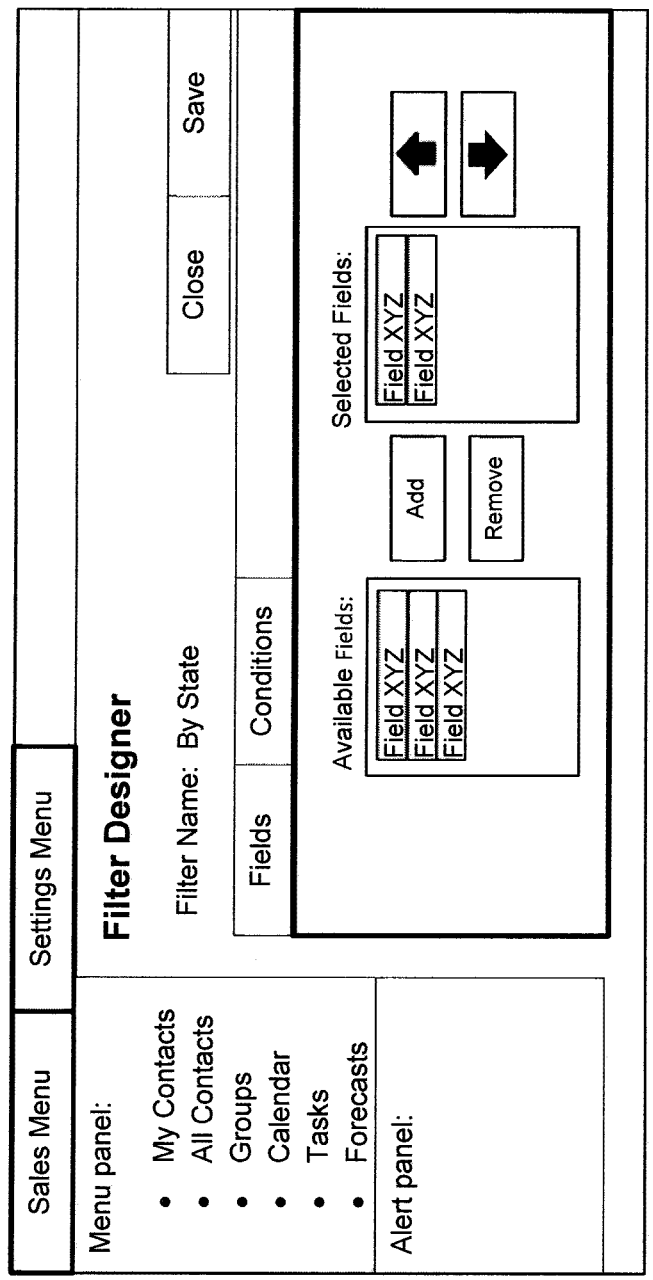
FIG. 33 is an example of a filter view in HTML.

The nature of the Views in the system is not specified on purpose. The views themselves could be HTML-based, desktop views, or views on mobile devices. Exemplary embodiments of an HTML-based DirectoryView, an HTML-based DetailView, and an HTML-based FilterView are shown in FIGS. 31-33 respectively.

Figure 34:
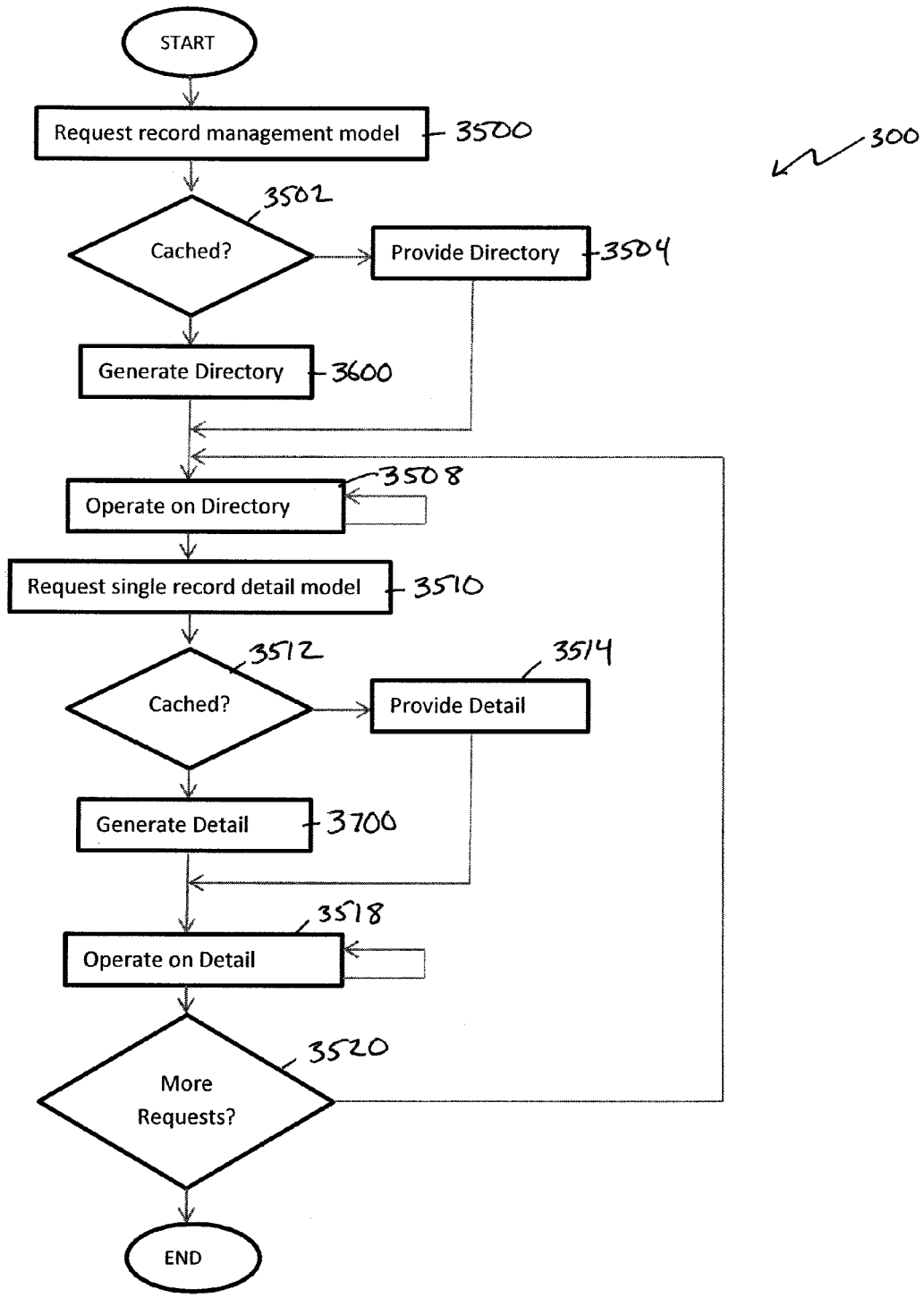
FIG. 34 shows an embodiment of a process for implementing abstract database record management in a software application.

FIG. 34 shows an embodiment of a process for implementing abstract record management 300 comprising the steps of requesting a record management model 3500, determining whether the records are cached in a directory 3502 and either providing a directory 3504 or generating a directory 3600, operating on the directory 3508, requesting a single record detail model 3510, determining whether the detail object is cached 3512 and either providing a detail object 3514 or generating a detail object 3516, operating on the detail 3518, and determining if there are additional record requests 3520.

Figure 35:
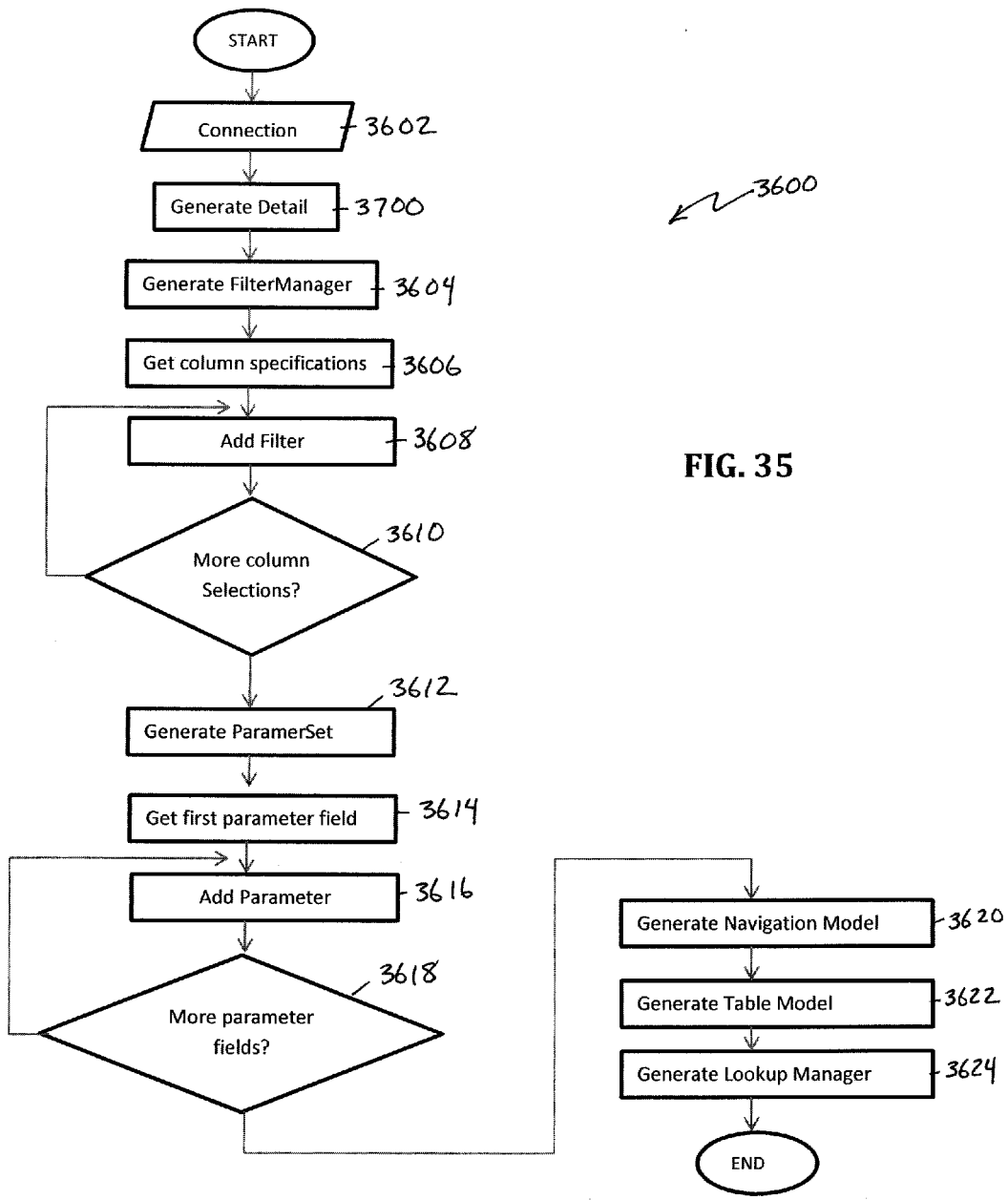
FIG. 35 shows an embodiment of a process for generating a directory in an abstract database record management process.

FIG. 35 shows an embodiment of a process for generating a directory 3600 comprising the steps of establishing a connection to a database 3602, generating a detail object 3700, generating a FilterManager 3604, getting column specifications from a database table 3606, adding a filter to the directory based upon the column specifications 3608, determining whether more column selections exist 3610, generating a ParameterSet 3612, getting a first parameter field 3614, adding a parameter to the directory 3616, determining if additional parameter fields exist 3618, generating a NavigationModel 3620, generating a TableModel 3622, and generating a LookupManager 3624.

Figure 36:
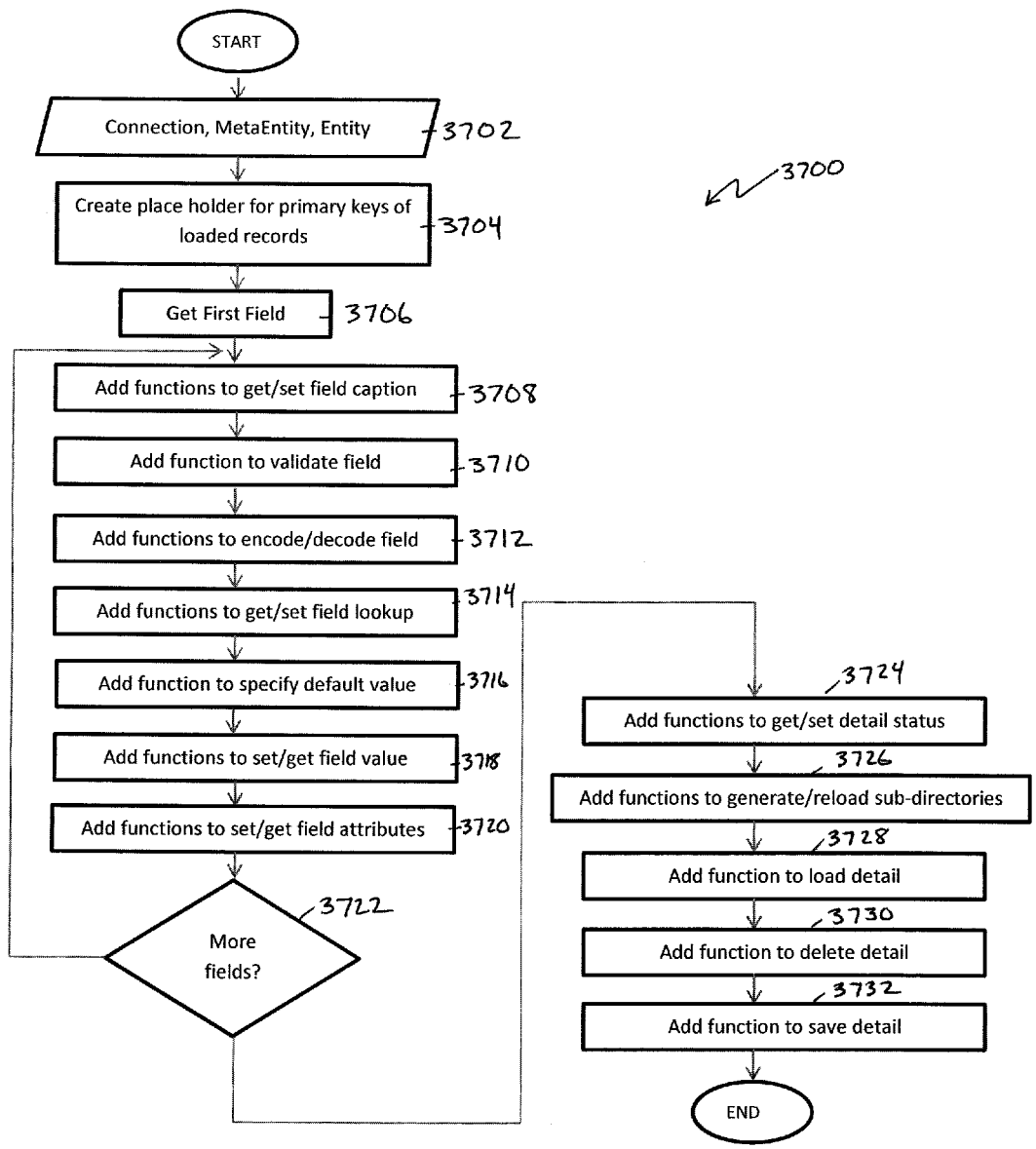
FIG. 36 shows an embodiment of a process for generating detail in an abstract database record management process.

FIG. 36 shows an embodiment of a process for generating a detail object 3700 comprising the steps of inputting Connection, MetaEntity, and Entity objects 3702, creating place holders for primary keys of loaded records 3704, getting a first field 3706, adding functions to get and set field captions 3708, adding a function to validate the field 3710, adding functions to encode and decode the field 3712, adding functions to get and set a field lookup 3714, adding functions to specify a default field value 3716, adding functions to get and set the field value 3718, adding functions to get and set field attributes 3720, determining whether more fields exist 3722, adding functions to get and set a detail status 3724, adding functions to generate and reload sub-directories 3726, adding a function to load the detail object 3728, adding a function to delete the detail object 3730, and adding a function to save the detail object 3732.

Independence from Presentation Layer or Rendering Medium

Presentation independence is achieved via a module named Render. The Render module implements a generic rendering loop to allow views of the application state to be presented to the user on the medium of choice. Several rendering mediums exist, including HTML renderer for web applications, Desktop SWING renderer for desktop applications, OpenGL graphics renderer for games and visual simulations, and various mobile phone renderers for, for example, Android®, Blackberry® and Apple® systems, and their number will grow. While each rendering medium is accessed differently, the Render module describes a uniform way for the application to access this facility. The application platform puts strict constraints on what can happen within a View object that renders application state and is managed by the Render module The Rendering Loop The primary purpose of the Render module is to act as a rendering loop. A rendering loop will issue drawing tasks to the underlying presentation medium. The presentation medium might be represented by a special driver object but the Render module should expose its functionality transparently. Frequently the layout of the views is represented by a hierarchy or a graph structure. Such graph structures implicitly determine the order of drawing. In special cases such as game rendering loops, the ordering is not as clear because transparency and other effects might require the same view to be rendered multiple times. In these special cases the Render module will use the view hierarchy to compile a task list which is then executed in the loop. In some embodiments, the Render module is configured to collect user input and associate the input with the view or views. After the association process, the input events appear in the application as if they came from a view instead of an input device.

The Model

For a plain data object to be considered a model it needs to adhere to the ModelFace interface API contract. A model stores all or part of the application state and implements the logic to manipulate the state. All model objects primarily reside with the Kernel module. In some embodiments, a model might have child models. If the models represent documents, an entire graph is also known as a document object model. The model represents everything essential about the application. It is unaware of the way it is presented by the views except to manage a list of views and to dispatch messages to these attached views when the model state changes. In this way, a model represents a unit of code that can be developed independently of the presentation layer.

Each model implements at least following ModelFace methods:
  beginUpdate—used to gain exclusive access to the model.
  endUpdate—used to release exclusive access.
  commitUpdate—used to apply model changes.
  addListener—used to register objects, including views, monitoring model state.
  removeListener—used to unregister listener object.
  notifyListener—dispatch a message to all registered listeners.

The View

The View interface API is a contract that describes what each view must do. A view implements the MessageListener interface and is therefore able to act as a monitor of state changes. A view is capable of painting its own state or the state of the underlying model to a presentation medium. The particular mechanics of how this occurs varies from case to case, so the View interface does not specify the routine to delegate for painting or any parameters such a routine would have. The View interface implements following set of methods:
  on Message—an on message method called whenever a message is passed to the view under the MessageListener interface.
  bindViewModel—a bind view model method to register and unregister the view as listener with a specified model.
  setViewModel—a set view model method to set the model which the view is observing.
  getViewModel—a get view model method to query the model that is bound to the view.

While a model might be monitored by several listeners, a view is only able to monitor one model at a time. If the view receives input messages, it will relay such messages to the model or call model routines to affect changes in state. The view also receives back messages from the model, as part of it MessageListener contract, and can react by signaling the need to repaint. The way a view receives messages from the model is through the single MessageListener method called on Message. This routine accepts a generic Message object.

The Message class is meant to be extended for meaningful use but it can be used on its own. It stores three attributes: a timestamp of creation, the source of the message, and the target of the message. Both the source and target must be implementing the MessageListener interface. The description of the Message and the MessageListener as the source and destination of such messages is given here in the context of view and the model, however the same message passing is also implemented and used at the module level and in the application object. The modules and the application, as the top-most module, all implement a message passing loop that can receive messages asynchronously and dispatch them to other modules or MessageListener objects.

A set of views dedicated to the same presentation medium form a toolkit of widgets and other viewable elements that an application developer can use to produce a graphic user interface. For complete compatibility, each presentation medium must have the exact same set of views. One exemplary embodiment includes the following view sets:

HTML Renderer and views for web applications.
Swing Renderer and views for desktop applications.
Android® Renderer and views for Android® mobile applications.
Blackberry® Renderer and views for Blackberry® mobile applications.
Apple® Renderer and views for iPhone® and iPad® mobile applications.

Each of the view sets relies on the same underlying model objects. In the specific case of web applications, HTML elements are represented as view objects. Only when the view is rendered is the actual HTML created. All of the properties of the view are encoded in the view object. For example, exemplary view objects include HTMLComboboxView, HTMLButtonView, and HTMLTableView. When writing server-side code, other frameworks may represent HTML views in terms of objects for ease of use. What distinguishes the instant approach is that the HTML view objects are based on models.

Figure 37:
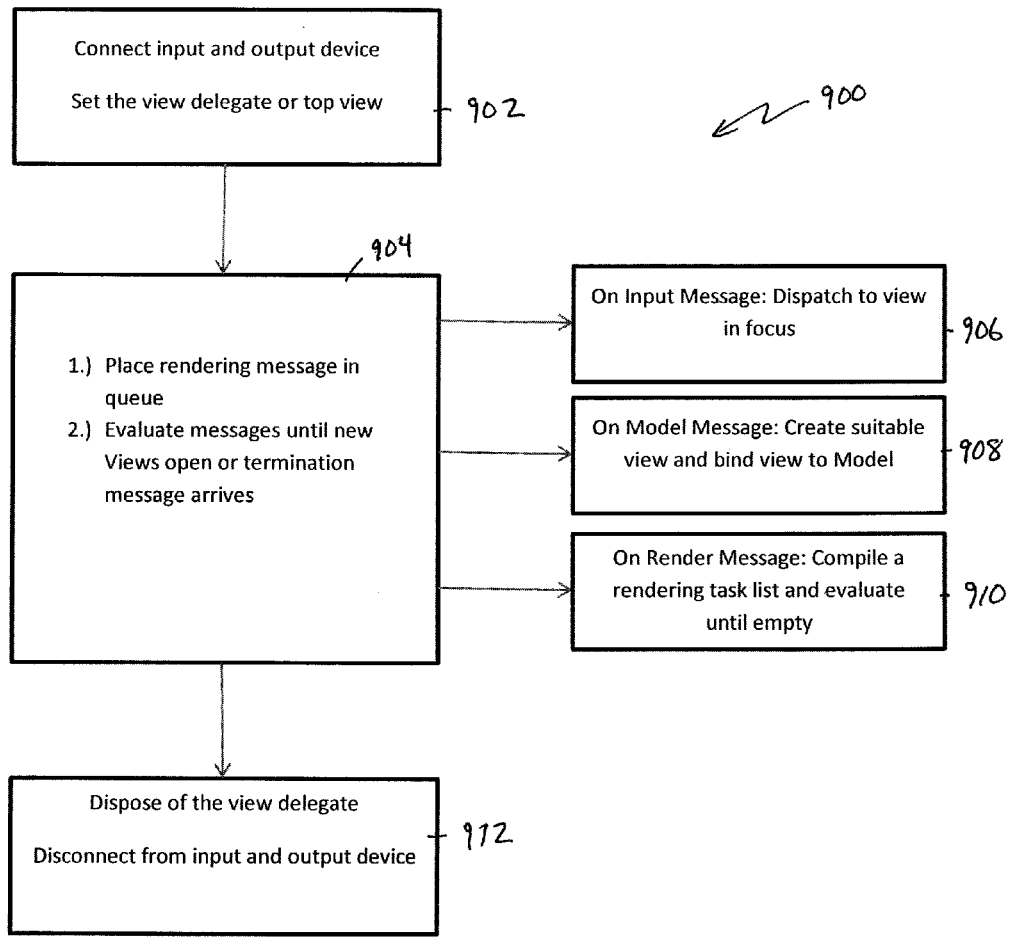
FIG. 37 shows an embodiment of a model for a rendering loop and a uniform user interface in a software application.

FIG. 37 shows an embodiment of a rendering loop and uniform user interface process 900 comprising the steps of connecting an input and output device and setting the delegate or top view 902; repeatedly placing a rendering message in a queue and evaluating messages until new views open or a termination message arrives 904; in the case of an OnInput message, dispatching to view in focus 906; in the case of an OnModel message, creating a suitable view and binding the view to a model 908; in the case of an OnRender message, compiling a rendering task list and evaluating the task list until it is empty 910; and disposing of the view delegate and disconnecting from the input and output device 912.

Figure 38:
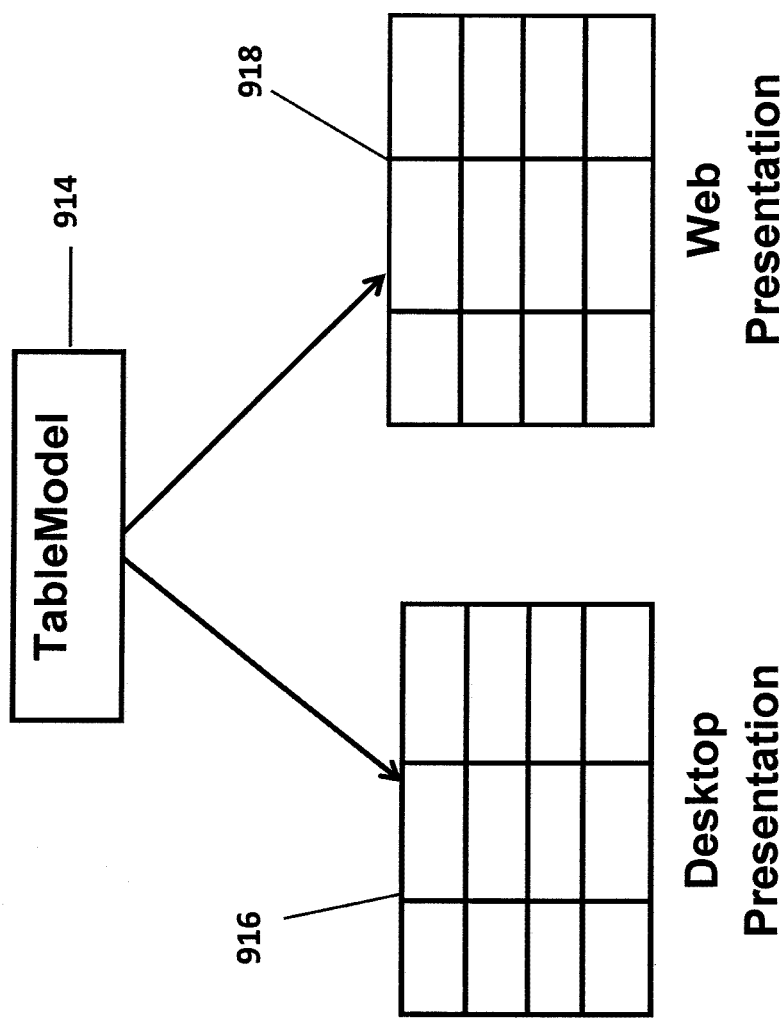
FIG. 38 shows an embodiment of presentation medium independence of a software object.

The instant system provides a model-view interface that is reusable across different presentation media. For example, as shown in FIG. 38, a single TableModel 914 can be displayed in a SwingTableView 916 for a desktop presentation and in an HTMLTableView 918 for a web browser presentation. Both views, in turn, interact with the same TableModel 914. There are two consequences to this. First, the same TableModel (i.e. contents) can be edited simultaneously through a web application and through a desktop application. Second, when creating software, developers can focus on developing models. The models encode the entire logic. Providing the software on a new medium such as the web is only a matter of adding the proper view sets. Since in this framework views are kept very thin in that they simply render underlying model objects, the effort of providing the application on a new medium is minimized. More importantly, developers can focus on developing software without having to worry about how it will be viewed.

Figure 39:
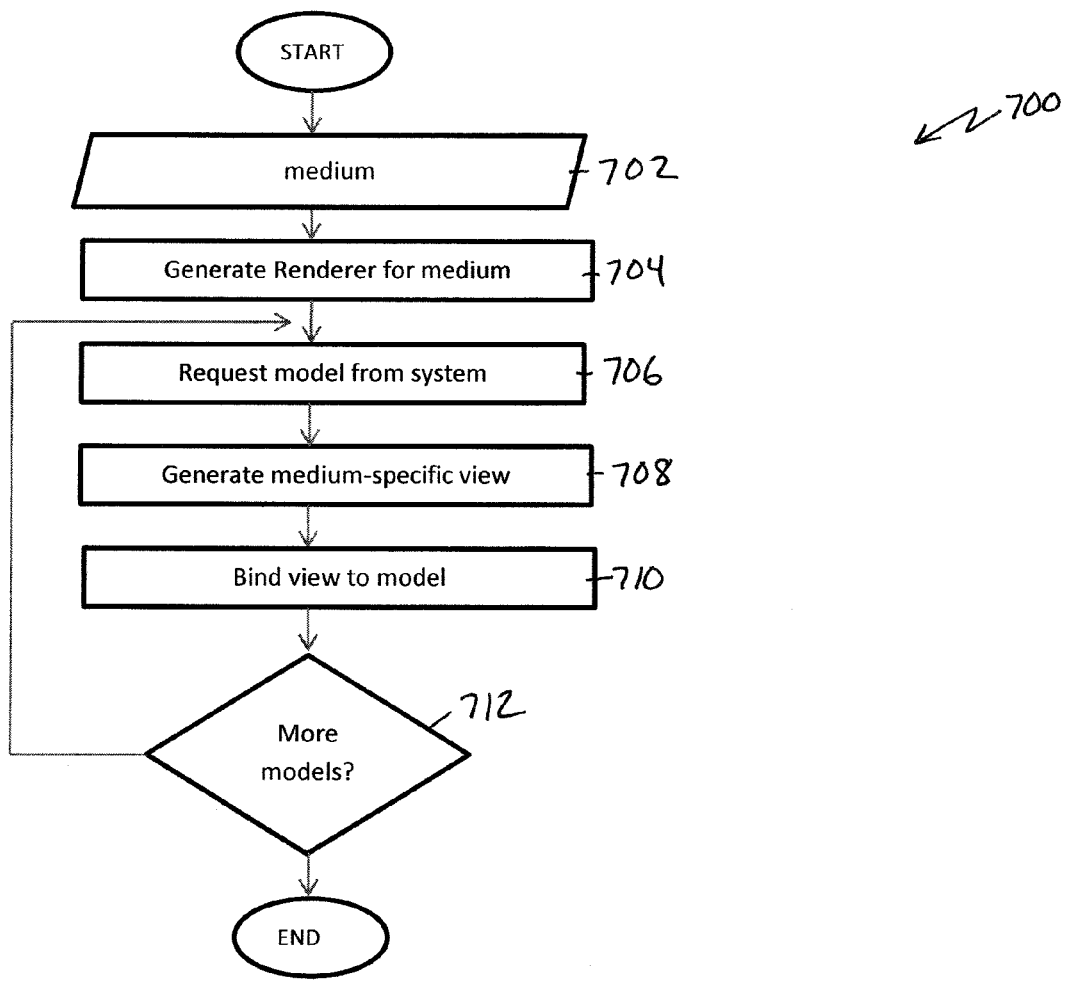
FIG. 39 shows an embodiment of a process for implementing a medium-specific presentation layer and auto-generating views in a software application.

FIG. 39 shows an embodiment of a process for implementing a medium-specific presentation layer and auto-generating views 700 comprising the steps of inputting a particular medium 702, generating a renderer object for the medium 704, requesting a model from the system 706, generating a medium-specific view 708, binding the view to the model 710, and determining if more models exist 712.

With respect to the overall system, what each module does during startup and shutdown can depend on the developer. However each module has the ability to cooperate with the Kernel and Render modules by providing these special modules with a model keeper, a view keeper and a menu. Model and View keepers are factory objects that can create new instances of models and views.

A Kernel module is de-facto top-most model of the application. It contains a global menu, a global model factory, and the top document. The global menu of action commands is accumulated by merging all local menus from other modules that cooperate with the kernel. The global menu is later displayed by the top window or top-most view of the Render module. The Kernel module routes action invocations from the local menus through itself to appropriate targets. The global model factory or keeper is another example of an aggregated or nested collection of model keepers from all participating modules. The global model keeper can create new instances of models or documents in one place regardless which module exported the particular model type. Finally, in some embodiments, the Kernel manages the top model or document. Embodiments in which the document model hosts child models which in turn host other child models are called document object models or DOMs. A DOM represents one central place for data and logic of an application. The behavior of the kernel module during initialization is important. Namely, during initialization (and in reverse order during shutdown) the Kernel will attempt to query all other loaded modules for their local menus and will merge all discovered menus in one global menu. Furthermore, it will also try to collect all local models and possibly view keepers or factories and make those available as a nested global factory to the rest of the application.

The Render module is typically more complex than the Kernel module. What data structures it holds depends heavily on the presentation medium it controls. Still two pieces of data belong with a Render module. First is a ubiquitous object called the context. The context represents the connection to the presentation medium and its actual interpretation is known to the Render module but not the rest of the application. The other data structure that belongs with Render module is the Top Window or top most view. The Top Window is the first and highest level user interface element of the application. In most embodiments, it will expose to the user the global menu hosted by the Kernel. Furthermore, when actions are invoked on the menu that result in the opening or creation of new documents, the Top Window creates appropriate views and embeds them in the user interface layout. The Top Window consults the global View keeper or factory, hosted either in the Kernel or Render module, to create such views. If necessary, such as in an HTML Render module, the Top Window might be required to implement the management of view layout. This layout management can be as basic as keeping track of which view is on top, or more complex such as including docking panes and floating user interface sections. In an embodiment for a web application, the Top Window implementation keeps track of open windows. When a window is closed, the one below is shown. This is a behavior not typical of web applications, but because in the instant framework web pages are represented as view objects, it is easily achievable. The behavior of the Render module is frequently limited to the initialization of the presentation medium and instantiation of the Top Window. The creation of the Top Window indirectly makes use of view and model keepers and binds the views to the models.

In some cases, the underlying presentation medium is already constructed to support a model-view architecture. For example, in Java SWING each user interface element is supported by a corresponding model. To prevent the models in the instant framework from importing dependencies that could tie them to the presentation medium, the models are wrapped so that they can be plugged into such model-view architectures, but without the models being aware of it.

The described approach can be implemented on nearly any general computing devices or computer processing devices such as desktop computers, laptop computers, work stations, servers, mobile devices, and even hard-wired into an electronic chip. It can use any database system and any operating system on which the chosen language is supported in connection with any storage medium. Presentation media can be anything from a computer desktop, a mobile device, or any programmable or networked device, and may include both audio and visual media.

While the application platform, systems, and processes have been described in reference to some exemplary embodiments, these embodiments are not limiting and are not necessarily exclusive of each other, and it is contemplated that particular features of various embodiments may be omitted or combined for use with features of other embodiments while remaining within the scope of the invention. Moreover, the use of computer programming naming conventions such as the use of capital letters, concatenated words, abbreviations and the like are not intended to be limiting in any way.

The invention claimed is:

1. A method of developing a software application configured to run on a computing device in an adaptive fashion and independent of operating system, database system, and presentation medium, comprising the steps of:
   using an operating system-independent computer programming language to create the software application comprised of one or more modules;
   using a persistence layer in the software application abstracting access to a database residing on a physical storage medium wherein the persistence layer abstracting access to data records at runtime without hardcoding specific information about each record type;
   using a record management layer in the software application collecting and manipulating data record information in the persistence layer through both an application programming interface and one or more user interfaces and providing management functionality at runtime for a given record type;
   using an adaptive presentation layer in the software application generating a plurality of views from a single set of data models that display on a plurality of presentation media and wherein the presentation layer auto-generating views at runtime based on the structure of the data models such that the views reflect changes in the database; and
   releasing the software application for use on one or more computing devices.

2. The method of claim 1, further comprising:
   wherein the persistence layer is capable of adjusting itself to structural changes of data residing in the database.

3. The method of claim 1, further comprising:
   wherein the record management layer is capable of adjusting to changes in the persistence layer and storage medium.

4. The method of claim 1, further comprising:
   wherein the persistence layer is configured to access a plurality of database protocols.

5. The method of claim 1, further comprising:
   wherein the persistence layer is configured to access two or more databases simultaneously.

6. The method of claim 1, further comprising:
   wherein the software application comprises a main application module, a kernel module, a storage module, and any custom-added modules.

7. A persistence layer system for providing a computer software application uniform and dynamic access to a physical storage medium, comprising:
   a transient computer memory;
   a processor;
   a connection object executed by the processor to communicate data records between a file system or database residing on the physical storage medium and the computer software application residing in the transient computer memory wherein the connection object includes functions to load, find, save, create and synchronize record objects with corresponding entries in the storage medium and functions to initiate and end storage sessions and ensure exclusive access to storage medium resources;
   wherein further the connection object initiates transactions with and communicates commands to the storage medium;
   a connection definition object executed by the processor to use the connection object to read meta record information from the file system or database wherein the meta record information includes record type and record structure;
   a plurality of record objects wherein each record object includes connection object origination information, a meta record object containing information describing the record object structure, record field values, and functions to get and set field values, field names, field attributes and a record state that indicates a stage of a record life cycle;
   wherein the connection definition object includes functions to retrieve information relevant to creating meta records dynamically;
   wherein each meta record object corresponds to an object in the physical storage medium and includes one or more of field names and field types;
   a plurality of entity objects wherein each entity object enforcing data coherence rules over a set of related record objects and data fields;
   wherein each entity object includes a meta entity object containing information describing the entity object structure and containing at least one meta record object;
   wherein each entity object includes one or more default field values;
   wherein each entity object accepting instructions to modify one or more data fields consistent with the data coherence rules at runtime;
   wherein each entity object provides a plugin mechanism to allow changes to be performed before and after life cycle events; and
   wherein each entity object validating data field values at runtime.

8. The system of claim 7, further comprising:
   wherein the file system or database is a relational database;
   wherein the connection definition object includes functions to retrieve table names, table columns, column types, schemas, primary and foreign keys that are relevant to creating record objects dynamically from relational databases; and wherein each meta record object includes one or more of foreign keys and primary keys.

9. The system of claim 7, further comprising:
wherein each meta record object corresponds to a table in a relational database.

10. The system of claim 7, further comprising:
wherein each meta record object corresponds to a file in a file system.

11. The system of claim 7, further comprising:
a plurality of connection objects each configured to communicate data records between a file system or database residing on the storage medium and the application program residing in transient computer memory; and
wherein the system is configured to allow the transfer of data records between each connection object and its associated database.

12. The system of claim 7, further comprising:
wherein each meta record object is manually constructed.

13. The system of claim 7, further comprising:
wherein each meta record object is created from an annotated class and a native or emulated reflection process.

14. The system of claim 7, further comprising:
wherein each meta record object is created dynamically at runtime from the connection definition object, which in turn allows record and entity objects to be created dynamically at runtime.

15. A record management system for managing information in a computer software application running on a computing device, comprising:
a processor;
a physical storage medium;
a persistence layer executed by the processor to provide the computer software application uniform and dynamic access to a database residing on the physical storage medium;
a detail object configured at runtime to coordinate and manipulate a set of fields within an entity object wherein the detail object also allows custom operations to be infused and executed on the entity object;
a directory object coordinating and manipulating a set of entity objects at runtime, wherein the directory object includes:
(a) a connection with the persistence layer,
(b) a detail object,
(c) a filter manager and at least one filter extracting a subset of entity objects to be displayed,
(d) a parameter set with no or multiple parameters, wherein parameters capture field names and values by which to search, wherein the values are infused into the filter as conditions,
(e) a keeper object generating one or more data models and one or more data views and which is used for generating views and models at runtime,
(f) a navigation model object controlling the means for browsing through the set of available entity objects,
(g) a table entity face object configured at runtime by the filter object to store a page of the set of entity objects, and
(h) a lookup manager managing a plurality of lookup objects at runtime wherein lookup objects are used to replace field values containing references with interpretable values;

wherein multiple directory objects can be assigned a single detail view by one or more owner relationship objects which indicate the fields by which entity objects are related;
a directory view object associated with the directory object, constructing itself at runtime based upon the set of entity objects, and further comprising a plurality of sub-view objects, wherein the directory view and subviews reflecting any changes in the underlying directory objects and field definitions in the database;
wherein the directory view generates a subview for each object included in the directory including but not limited to a parameter view, a filter manager view, a parameter set view, a navigation view and a table view object wherein each subview is associated with the correspondingly named object from the directory object and wherein the subviews are generated at runtime using the keeper object;
wherein the directory view object and its subviews receiving input signals from a user to modify one or more of the parameters in the parameter set, at least one filter, the set of entity objects, the page, and the table entity face object and to relay the signals to the directory object or relevant sub-object; and
wherein the directory view object is further creating a detail view object in response to a signal from a user interface object wherein the detail view object is associated with the detail object.

16. The system of claim 15, further comprising:
wherein the table view includes a plugin mechanism for rendering rows and cells.

17. The system of claim 15, further comprising:
a row renderer object configured to display table rows in a customized fashion;
a cell renderer object configured to display table cells in a customized fashion;
wherein the cell renderer objects can be infused into the directory view, for a specific cell, for a specific field name or for a field type.

18. A presentation layer system for providing a computer software application independent of presentation medium and capable of auto-generating user interfaces for record management tasks and application tasks in general, comprising:
a processor;
a dynamic record management system;
one or more model objects implementing a model interface;
an abstract interface for a model that allows multiple views to bind and allows the views to explore its structure and presentation needs wherein the same set of models are associated with views on different presentation mediums;
one or more view objects each implementing a view interface wherein each view object interface is being bound to a model and becoming a listener object that listens for messages originating from the model object;
wherein all views bound to the model object are notified of a change in the model object and subsequently update themselves;
wherein each view keeps a reference to each model object to which it is bound;
wherein each model keeps references to each view that is subscribed or bound to it;
wherein the model object interface of each model object is being bound to multiple view objects;

wherein on receiving a user input signal, the view relays information and commands to the model and updates itself if it is notified by the model of any resulting changes;

a rendering module invoking the drawing of user interface objects on a specific presentation medium, wherein each presentation medium shares the same set of underlying models; and wherein the rendering module generating dynamically at runtime a plurality of medium and model specific user interface objects for the computer software application using the model interface to explore its structure and its view placement, so as to reflect any changes in the models and in the underlying database structure, and using a facility to request and construct views.

19. The system of claim 18, further comprising:

wherein the facility to request and construct views is a view keeper;

wherein the view keeper is capable of generating a view object when given a model and is capable of caching previously generated views; and wherein the view keeper binds the view object to one model.

* * * * *